(12) United States Patent
Kaneda

(10) Patent No.: US 9,706,101 B2
(45) Date of Patent: Jul. 11, 2017

(54) IMAGE PROCESSING TERMINAL, IMAGING MACHINE, INFORMATION PROCESSING METHOD, PROGRAM, AND REMOTE IMAGING SYSTEM TO REMOTELY OPERATE THE IMAGING MACHINE

(71) Applicant: SONY CORPORATION, Tokyo (JP)

(72) Inventor: Satoshi Kaneda, Ibaraki (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 14/436,038

(22) PCT Filed: Oct. 10, 2013

(86) PCT No.: PCT/JP2013/077545
§ 371 (c)(1),
(2) Date: Apr. 15, 2015

(87) PCT Pub. No.: WO2014/065127
PCT Pub. Date: May 1, 2014

(65) Prior Publication Data
US 2015/0319353 A1 Nov. 5, 2015

(30) Foreign Application Priority Data

Oct. 22, 2012 (JP) ................. 2012-233112

(51) Int. Cl.
*H04N 5/232* (2006.01)
*G06F 3/048* (2013.01)

(52) U.S. Cl.
CPC ......... *H04N 5/23206* (2013.01); *G06F 3/048* (2013.01); *H04N 5/23216* (2013.01); *H04N 5/23245* (2013.01)

(58) Field of Classification Search
CPC ............... H04N 5/232; H04N 5/23203; H04N 5/23206; H04N 7/185; H04N 21/4223; H04N 1/00411; H04N 1/00408
(Continued)

(56) References Cited

U.S. PATENT DOCUMENTS 8,878,994 B2 * 11/2014 Arai ................... H04N 21/4126
345/156
2007/0291114 A1 * 12/2007 Oshima ................ H04N 3/1575
348/126
(Continued)

FOREIGN PATENT DOCUMENTS

JP HEI 08-069048 A 3/1996
JP 2001-298653 A 10/2001
(Continued)

*Primary Examiner* — Kelly L Jerabek
(74) *Attorney, Agent, or Firm* — Chip Law Group

(57) ABSTRACT

The present technique relates to an information processing terminal, an imaging machine, an information processing method, a program, and a remote imaging system configured to be able to remotely operate an imaging machine as if operating the machine directly.

An information processing terminal of the present technique includes: a communication unit that wirelessly communicates with an imaging machine to receive imaging machine information including identification information of the imaging machine and an image during capturing by the imaging machine; a generation unit that generates an image of an external appearance of the imaging machine based on the imaging machine information; a display control unit that displays the image during capturing and the image of the external appearance on one screen in a display unit; and a detection unit that detects contact operation on the display unit, wherein the display control unit changes a direction and a size of the image of the external appearance in response to (Continued)

the contact operation. The present technique can be applied to a portable appliance having a display and a touch panel.

19 Claims, 32 Drawing Sheets

(58) Field of Classification Search
USPC ...... 348/211.99, 211.1–211.4, 211.8–211.11, 348/333.01–333.02, 333.04, 333.12
See application file for complete search history.

(56) References Cited

U.S. PATENT DOCUMENTS

| | | | | |
|---|---|---|---|---|
| 2008/0303909 | A1* | 12/2008 | Watanabe | H04N 1/00127 348/211.2 |
| 2011/0050901 | A1* | 3/2011 | Oya | H04N 7/183 348/143 |
| 2011/0115930 | A1* | 5/2011 | Kulinets | H04N 1/00132 348/211.2 |

FOREIGN PATENT DOCUMENTS

| | | |
|---|---|---|
| JP | 2004-274400 A | 9/2004 |
| JP | 2005-301992 A | 10/2005 |
| JP | 2008-276126 A | 11/2008 |
| JP | 2009-094563 A | 4/2009 |
| JP | 2009-094591 A | 4/2009 |

* cited by examiner

FIG. 7

| CONTROL COMMAND LIST | | | | ASSOCIATION INFORMATION | |
|---|---|---|---|---|---|
| OPERATION KEY | CONTROL COMMAND NUMBER | CONTROL COMMAND NAME | AUTOMATIC RESTORATION | POSITION COORDINATE | OPERATION HISTORY |
| MODE DIAL | 1 | MODE DIAL (CLOCKWISE) | 0 | x1, y1 | 0 |
| | 2 | MODE DIAL (COUNTERCLOCKWISE) | 0 | | 1 |
| SHUTTER KEY | 3 | SHUTTER KEY (HALF-PRESS) | 1 | x2, y2 | 0 |
| | 4 | SHUTTER KEY (FULLY PRESS) | 1 | | 0 |
| ZOOM KEY | 5 | ZOOM KEY (TELE) | 1 | x3, y3 | 0 |
| | 6 | ZOOM KEY (WIDE) | 1 | | 0 |
| ... | ... | ... | ... | ... | ... |

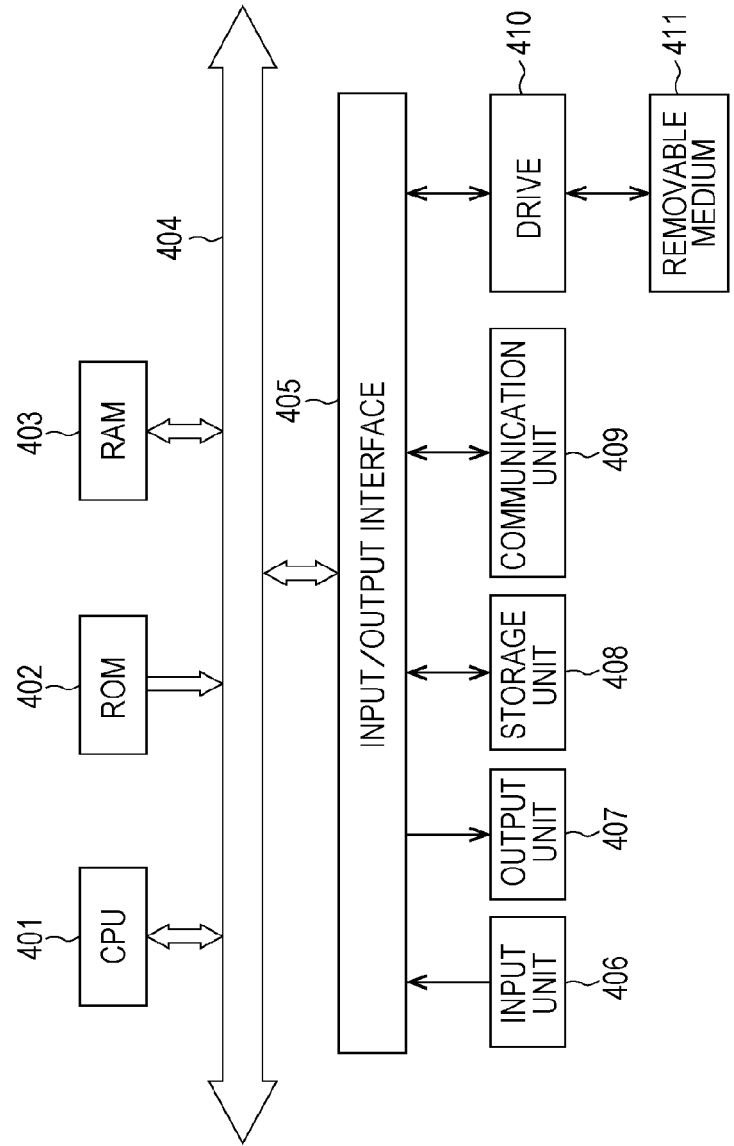

IMAGE PROCESSING TERMINAL, IMAGING MACHINE, INFORMATION PROCESSING METHOD, PROGRAM, AND REMOTE IMAGING SYSTEM TO REMOTELY OPERATE THE IMAGING MACHINE

TECHNICAL FIELD

The present invention relates to an information processing terminal, an imaging machine, an information processing method, a program, and a remote imaging system, and particularly to an information processing terminal, an imaging machine, an information processing method, a program, and a remote imaging system configured to be able to remotely operate an imaging machine as if operating the machine directly.

BACKGROUND ART

Various techniques for remotely operating an imaging machine such as a digital still camera have been suggested. For example, Patent Literature 1 has disclosed the technique of displaying, on a display of an imaging machine on the operating side having a touch panel, an image of operation keys arranged in a manner similar to operation keys of the imaging machine on the operated side. Upon the operation of the image of the operation key, the request of executing the operation corresponding to the operation key is transmitted wirelessly to the imaging machine on the operated side from the imaging machine on the operating side, whereby various processes are executed in the imaging machine on the operated side.

Patent Literature 2 has disclosed the technique in which, in the case where the imaging machine on the operated side includes the operation key that does not exist in the imaging machine on the operating side, the item of the operation corresponding to that operation key is added to the menu image of the imaging machine on the operating side.

CITATION LIST

Patent Document

Patent Document 1: JP 2009-94591 A
Patent Document 2: JP 2009-94563 A

SUMMARY OF THE INVENTION

Problems to be Solved by the Invention

In the technique according to Patent Literature 1, a monitor image transmitted regularly from the imaging machine on the operated side is displayed on the display of the imaging machine on the operating side together with the image representing the external appearance of the rear surface of the imaging machine on the operated side. Therefore, the operation key displayed as the image on the display of the imaging machine on the operating side is limited to the operation key on the rear surface of the imaging machine on the operated side and the user cannot operate the other operation keys.

In the technique according to Patent Literature 2, the menu image containing the items different from the items in the normal imaging time is displayed, so that the user finds it difficult to conduct the familiar operation and the wrong operation may be caused.

The present technique has been made in view of such circumstances, and allows the imaging machine to be remotely operated in a manner similar to direct operation.

Solutions to Problems

An information processing terminal according to a first aspect of the present technique includes: a communication unit that communicates wirelessly with an imaging machine to receive imaging machine information including identification information of the imaging machine and an image during capturing by the imaging machine; a generation unit that generates an image of an external appearance of the imaging machine based on the imaging machine information; a display control unit that displays the image during capturing and the image of the external appearance on one screen of a display unit; and a detection unit that detects contact operation on the display unit, wherein the display control unit changes a direction and a size of the image of the external appearance in response to the contact operation.

The detection unit can detect the contact operation for an operation key image corresponding to an image of an operation key provided for the imaging machine, which is included in the image of the external appearance, and the communication unit can transmit a control command in accordance with the operation key image for which the contact operation has been performed to the imaging machine.

The display control unit can change the state of the operation key image in response to the detection of the contact operation for the operation key image.

A management unit that manages information representing whether the operation key is an operation key that, after the operation, returns to the state before the operation, and a history management unit that manages the history of operation using the operation key image can be further provided. In this case, if the history includes the operation using the operation key image representing the operation key that does not return to the state before the operation, the display control unit can display the information notifying that the state of the operation key in the imaging machine is different from the state after the operation at the end of the communication with the imaging machine.

The imaging machine information may include the control command and the information representing whether the key is the key that returns to the state before the operation.

The generation unit can generate the image of the external appearance by acquiring data of the image of the external appearance from a server connected through a network based on the identification information.

The imaging machine information may include information representing the shape of the imaging machine and information representing the arrangement of the operation keys on the imaging machine. In this case, the generation unit can generate the image of the external appearance based on the information included in the imaging machine information.

The communication unit can receive as the image during capturing, the image obtained by overlapping the information representing the state of the imaging machine on the image during capturing by the imaging machine.

The display control unit can display the image during capturing and the image of the external appearance in regions formed not to overlap with each other within the screen, and change the size of a display region of the image during capturing and the size of a display region of the image of the external appearance in response to the contact operation.

The communication unit can receive information representing that the motion has been detected, which is transmitted from the imaging machine, and upon the reception of the information representing the motion has been detected, the display control unit can display the information representing that the motion has been detected in the imaging machine.

An imaging machine according to a second aspect of the present technique includes: an imaging unit; a communication unit that wirelessly communicates with an information processing terminal which displays on one screen of a display unit, an image during capturing and an image of an external appearance of the imaging machine generated based on imaging machine information including identification information of the imaging machine, and which changes a direction and a size of the image of the external appearance in response to contact operation on the display unit to transmit the imaging machine information and the image during capturing by the imaging unit, and receive a control command in accordance with an operation key image for which the contact operation has been conducted, the operation key image corresponding to an image of the operation key on the imaging machine included in the image of the external appearance and the control command being transmitted from the information processing terminal in response to the detection of the contact operation for the operation key image; and an execution unit that performs a process in accordance with the control command.

The display unit that displays the image during capturing, the management unit that manages the operation mode, and the display control unit that, while the operation mode for performing the process in accordance with the control command is set, controls not to display the image during capturing can be further provided.

The imaging machine information includes the control command, information representing whether the operation key is the key that, after the operation, returns to the state before the operation, information representing the shape of the imaging machine, and information representing the arrangement of the operation keys.

A motion detection unit that detects the motion of the imaging machine can be further provided. In this case, upon the detection of the motion, the communication unit can transmit the information representing that the motion has been detected to the information processing terminal.

A remote imaging system according to a third aspect of the present technique includes an information processing terminal and an imaging machine, the information processing terminal including: a communication unit that wirelessly communicates with the imaging machine to receive imaging machine information including identification information of the imaging machine and an image during capturing by the imaging machine; a generation unit that generates an image of an external appearance of the imaging machine based on the imaging machine information; a display control unit that displays the image during capturing and the image of the external appearance on one screen in a display unit; and a detection unit that detects contact operation on the display unit, wherein the display control unit changes a direction and a size of the image of the external appearance in response to the contact operation, the detection unit detects the contact operation on an operation key image corresponding to an image of an operation key on the imaging machine included in the image of the external appearance, and the communication unit transmits to the imaging machine, a control command in accordance with the operation key image for which the contact operation has been performed, the imaging machine including: an imaging unit; a communication unit that wirelessly communicates with the information processing terminal to transmit the imaging machine information and the image during capturing by the imaging unit and receive the control command transmitted from the information processing terminal; and an execution unit that performs a process in accordance with the control command.

In the first aspect of the present technique, the wireless communication with the imaging machine is conducted to receive the imaging machine information including the identification information of the imaging machine and the image during capturing by the imaging machine. Moreover, the image of the external appearance of the imaging machine is generated based on the imaging machine information, and the image during capturing and the image of the external appearance are displayed on one screen of the display unit. The contact operation on the display unit is detected, and the direction and the size of the image of the external appearance are changed in response to the contact operation.

In the second aspect of the present technique, the wireless communication is conducted with the information processing terminal which displays the image during capturing and the image of the external appearance of the imaging machine generated based on the imaging machine information including the identification information of the imaging machine on one screen of the display unit, and changes the size and direction of the image of the external appearance in response to the contact operation on the display unit. Moreover, the imaging machine information and the image during capturing by the imaging unit are transmitted, and a control command in accordance with an operation key image for which the contact operation has been conducted, the operation key image corresponding to an image of the operation key on the imaging machine included in the image of the external appearance and the control command being transmitted from the information processing terminal in response to the detection of the contact operation for the operation key image is received. In addition, the process in accordance with the control command is performed.

In the third aspect of the present technique, the information processing terminal wirelessly communicates with the imaging machine to receive the imaging machine information including the identification information of the imaging machine and the image during capturing by the imaging machine. Moreover, the image of the external appearance of the imaging machine is generated based on the imaging machine information, and the image during capturing and the image of the external appearance are displayed on one screen of the display unit. The contact operation on the display unit is detected, and the direction and size of the image of the external appearance are changed in response to the contact operation. Moreover, the contact operation for the operation key image corresponding to the image of the operation key on the imaging machine, which is included in the image of the external appearance, is detected, and the control command corresponding of the operation key image for which the contact operation has been performed is transmitted to the imaging machine. On the other hand, the imaging machine wirelessly communicates with the information processing terminal to transmit the imaging machine information and the image during capturing by the imaging unit. The control command transmitted from the information processing terminal is received and the process in accordance with the control command is performed.

Effects of the Invention

The present technique enables the imaging machine to be remotely controlled in a manner similar to the direct operation.

BRIEF DESCRIPTION OF DRAWINGS

FIG. 7 is a diagram illustrating an example of a control command list.

FIG. 34 is a block diagram illustrating a structure example of a computer.

MODE FOR CARRYING OUT THE INVENTION

<Structure Example of Remote Imaging System>

Figure 1:
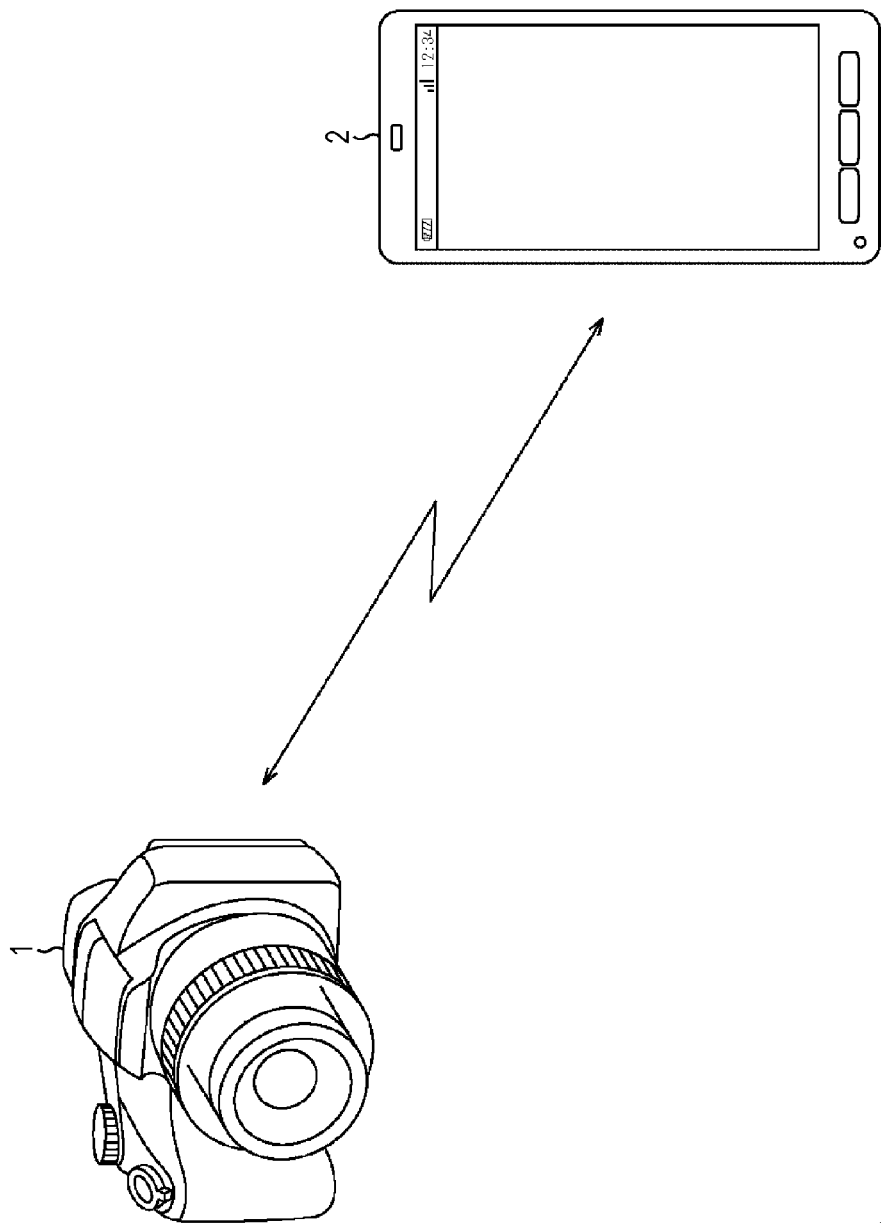
FIG. 1 is a diagram illustrating a structure example of a remote imaging system according to an embodiment of the present technique.

FIG. 1 is a diagram illustrating a structure example of a remote imaging system according to an embodiment of the present technique.

A remote imaging system in FIG. 1 includes an imaging machine 1 and an operating machine 2. Here, description is made of the case in which a portable information processing terminal such as a so-called smart phone is used as the operating machine 2 and remote imaging is performed by operating the imaging machine 1 such as a digital still camera. For example, the imaging machine 1 is fixed by a tripod or the like at a position apart from the operating machine 2 carried by a user.

The imaging machine 1 corresponds to, for example, a lens interchangeable digital still camera. A front surface of a housing of the operating machine 2 is provided with a display, and the display is provided with a touch panel. A user can operate the machine by, for example, touching a button displayed on the display with a finger. As indicated by a bidirectional arrow, the imaging machine 1 and the operating machine 2 can exchange data with each other through wireless communication such as wireless LAN or Bluetooth (registered trademark).

The imaging machine 1 has at least two operation modes of a normal imaging mode and a remote imaging mode. A user can change the operation mode by operating the imaging machine 1, for example.

The normal imaging mode is the mode in which each operation is executed based on the operation of the operation key on the imaging machine 1 by the user. The remote imaging mode is the mode in which each operation is executed based on the request transmitted from the operating machine 2. While the remote imaging mode is set, basically, the direct operation of the imaging machine 1 is disabled.

On the other hand, the operating machine 2 has at least the operation mode of the remote operation mode.

The remote operation mode is the mode in which an operation execution request is transmitted to the imaging machine 1 through wireless communication to operate the imaging machine 1 remotely. The imaging machine 1 may have the remote operation mode and the operating machine 2 may have the normal imaging mode and the remote imaging mode.

In the remote imaging system in FIG. 1, for example, when the remote imaging mode is set in the imaging machine 1 and the remote operation mode is set in the operating machine 2, a model image and a monitor image are displayed side by side on the display of the operating machine 2.

The model image is an image representing the external appearance of the imaging machine 1 stereoscopically. The model image includes operation key images corresponding to the images of the operation keys on the main body of the imaging machine 1, which are arranged in the same order as the operation keys in the imaging machine 1. Note that the stereoscopic image does not refer to the so-called 3D image obtained by guiding parallax left-eye image and right-eye image to left and right eyes of the user, respectively.

The monitor image is the image captured by the imaging machine 1. The image captured by the imaging machine 1 is not displayed on the display of the imaging machine 1 but is transmitted from the imaging machine 1 to the operating machine 2 and displayed on the display of the operating machine 2 as the monitor image.

As described below, the model image can be directed differently by a slide operation or magnified or reduced in size by a pinching operation. The user can display the image of the operation key on each surface of the imaging machine 1 on the model image, and can tap the displayed operation key image to execute the contact operation.

Upon the contact operation on the operation key image, the execution request of the operation corresponding to the operation key image is transmitted from the operating machine 2 to the imaging machine 1. For example, the user decides when to take a photograph while viewing the monitor image, and when the user touches the image of the shutter key on the model image, the signal requesting the capture of a still image is transmitted and the imaging machine 1 takes the photograph.

In this manner, the model image contains the operation key images in the same order as the operation keys in the imaging machine 1. The user can operate the operating machine 2 remotely as if the user operates the imaging machine 1 directly.

Since the display of the model image can be changed by the slide operation or the pinching operation, the user can operate using not just the operation key appearing in a particular range but also the operation key images at positions of the imaging machine 1.

The operation of the imaging machine 1 and the operating machine 2 that conduct the remote imaging as above is described below with reference to the flowchart.

<Structure Example of Imaging Machine 1>
[Structure of External Appearance]

Figure 2:
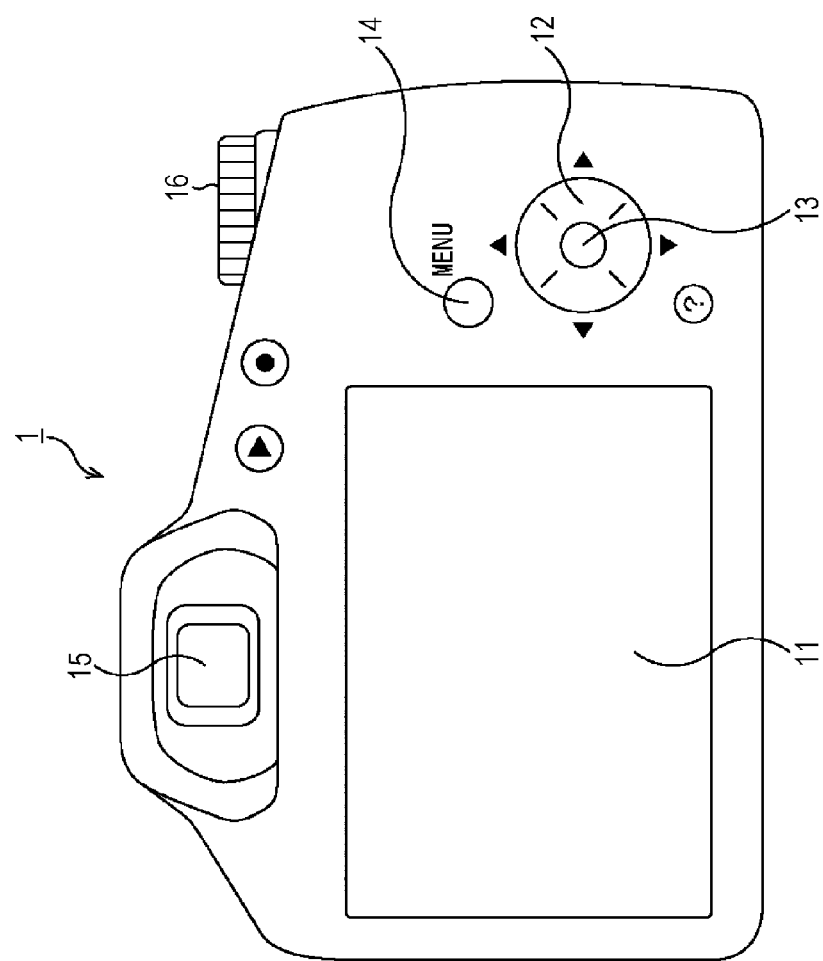
FIG. 2 is a diagram illustrating a structure example of a rear surface of an imaging machine.

FIG. 2 is a diagram illustrating a structure example of a rear surface of the imaging machine 1.

In regard to the main structure, the rear surface of the imaging machine 1 is provided with a display 11 at a position closer to the left side than to the center. During the normal imaging mode, the display 11 displays the image during capturing and the captured image selected by the user.

On the right side of the display 11, a circular selection key 12 is provided and a decision key 13 is provided in the center of the selection key 12. For example, the selection key 12 is operated to move a cursor on the menu image displayed in the display 11 horizontally or vertically, and the decision key 13 is operated to decide the item out of the menu screen.

A menu key 14 is provided above the selection key 12. The menu key 14 is operated to display the menu image containing various items on the display 11.

A viewfinder 15 is provided above the display 11, and on the right side of the top surface of the main body of the imaging machine 1 is provided a mode dial 16 corresponding to a disc-like operation key. The mode dial 16 is operated to switch a plurality of imaging modes of the imaging machine 1.

Figure 3:
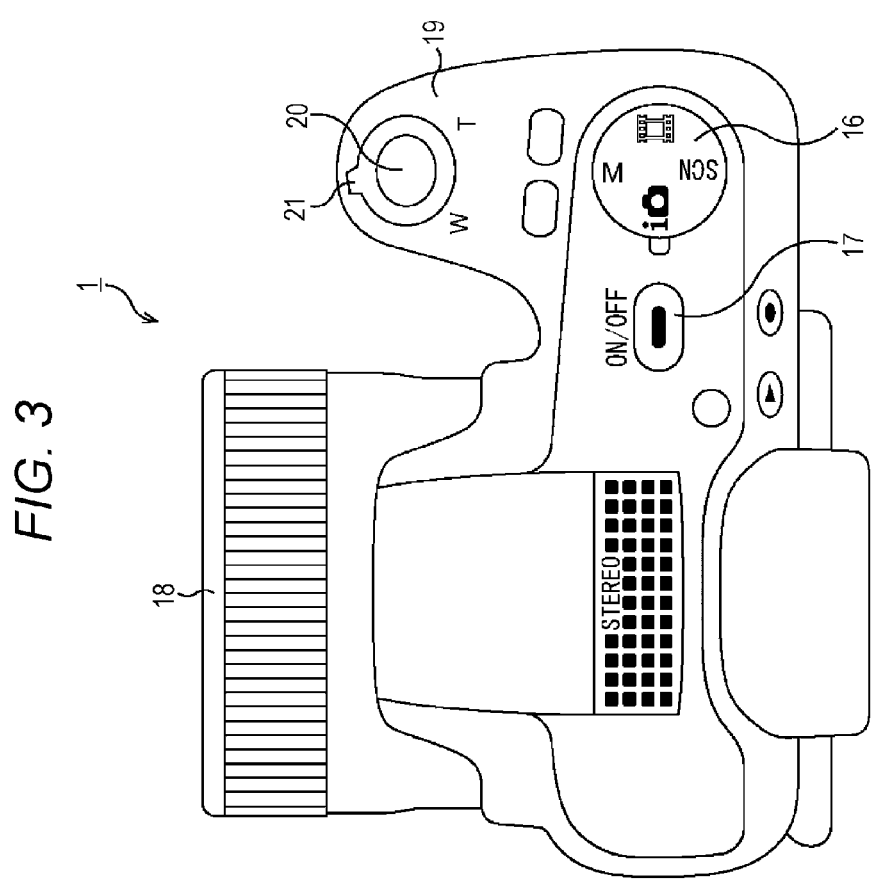
FIG. 3 is a diagram illustrating a structure example of a top surface of the imaging machine.

FIG. 3 is a diagram illustrating a structure example of the top surface of the imaging machine 1.

On the left side of the mode dial 16 is provided a power source key 17. The power source key 17 is operated to turn on or off the power source of the imaging machine 1.

On the left side of a front surface of the imaging machine 1 is provided a cylindrical lens unit 18 having a zoom lens, and on the right side thereof is provided a grip unit 19 projecting forward.

A top surface of the grip unit 19 is provided with a circular shutter key 20, and a zoom key 21 that is horizontally rotatable in a predetermined range is provided to surround the shutter key 20. The shutter key 20 is a two-step operation key. When the key is pressed in a first step to be a half-pressed state, the focus and exposure are optimized and fixed; then, when the key is pressed in a second step to be the fully pressed state, the image is captured. The zoom key 21 is operated to switch the viewing angle between the telescope side and the wide angle side.

In this manner, each surface of the main body of the imaging machine 1 is provided with the operation keys.

[Internal Structure]

Figure 4:
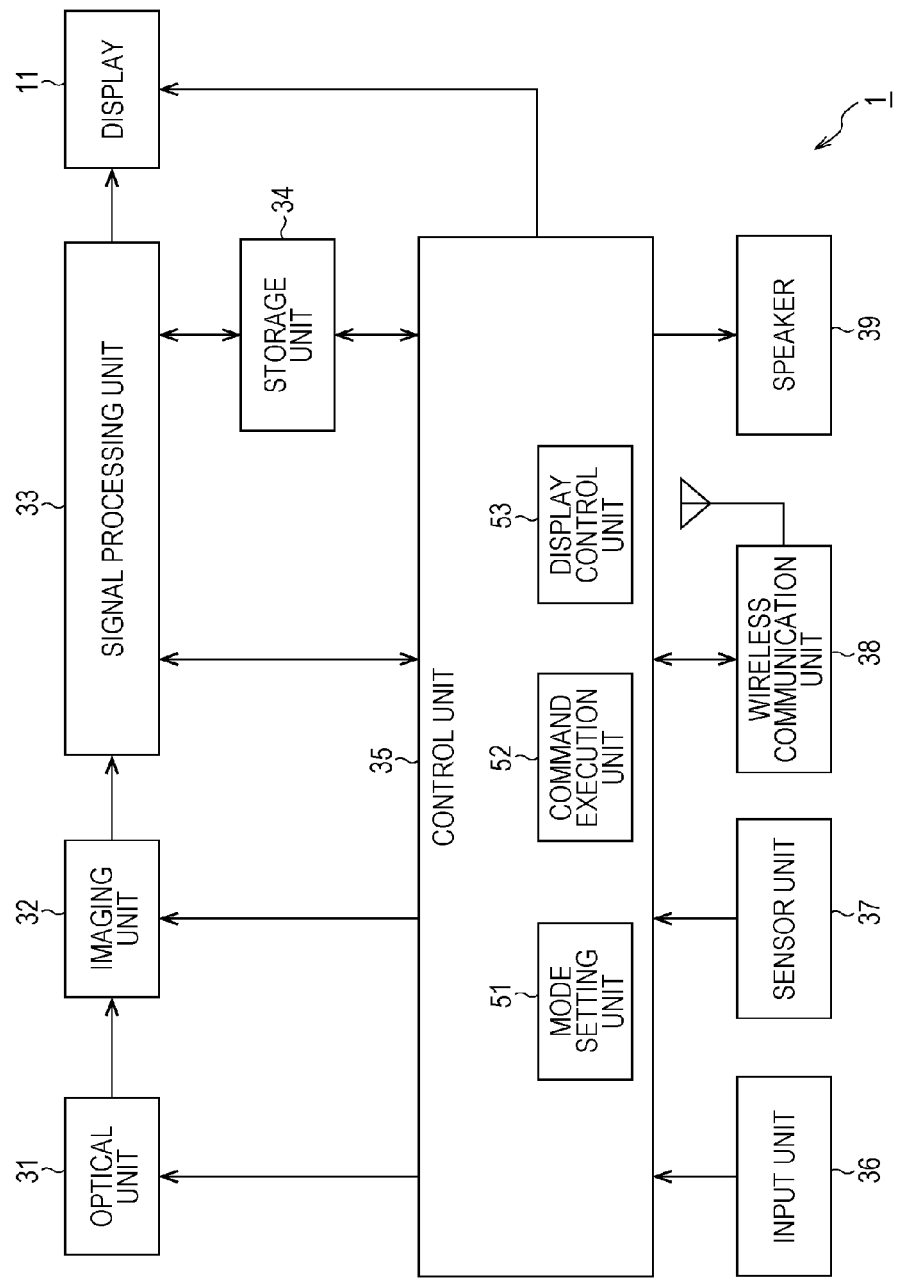
FIG. 4 is a block diagram illustrating a structure example of the imaging machine.

FIG. 4 is a block diagram illustrating a structure example of the imaging machine 1.

The imaging machine 1 includes, in addition to the display 11, an optical unit 31, an imaging unit 32, a signal processing unit 33, a storage unit 34, a control unit 35, an input unit 36, a sensor unit 37, a wireless communication unit 38, and a speaker 39.

The optical unit 31 includes a zoom lens or a focus lens that is included in the lens unit 18, a driving mechanism for the same, a shutter mechanism, an iris mechanism, and the like. The optical unit 31 is driven under the control of the control unit 35, and guides the light from a subject to the imaging unit 32.

The imaging unit 32 includes a solid-state imaging element that converts the light from the subject into electric signals, an A/D conversion circuit for digitizing the image signals from the solid-state imaging element, and the like. As the solid-state imaging element, a CCD (Charge Coupled Device), CMOS (Complementary Metal Oxide Semiconductor), or the like can be used.

The signal processing unit 33 performs signal processes such as image quality correction on the image signals from the imaging unit 32, generates the display image signals, and output the signals to the display 11. The signal processing unit 33 generates the compressed image data for recording based on the image signals after the signal process, and outputs the data to the storage unit 34 where the data are stored. In addition, the signal processing unit 33 extends the compressed image data read out of the storage unit 34, generates the display image signals, and outputs the signals to the display 11.

During the normal imaging mode, the image signals obtained by the signal processes of the signal processing unit 33 are output to the display 11 and used to display the image during capturing. During the remote imaging mode, the image data obtained by the signal processing by the signal processing unit 33 are output to the control unit 35 and the data are used to transmit the monitor image to the operating machine 2.

The storage unit 34 stores the image data for recording, which are generated by the signal processing unit 33. As the storage unit 34, for example, a portable recording medium such as a memory card including a flash memory, or an optical disk, or a solid recording medium such as an HDD (Hard Disk Drive) is used.

The control unit 35 is a microcomputer including a CPU (Central Processing Unit) and a memory such as a ROM (Read Only Memory) or a RAM (Random Access Memory).

The control unit 35 controls the entire operation of the imaging machine 1 by executing the programs stored in the memory.

As illustrated in FIG. 4, a mode setting unit 51, a command execution unit 52, and a display control unit 53 are achieved by executing a predetermined program in the control unit 35.

The mode setting unit 51 manages the operation mode of the imaging machine 1.

The command execution unit 52 executes the control command transmitted from the operating machine 2 during the remote imaging mode, and performs various kinds of processes in accordance with the control command, such as the capture of the still image or the zoom adjustment. The control command transmitted from the operating machine 2 is received by the wireless communication unit 38 and supplied to the control unit 35.

The display control unit 53 controls the display of the display 11. For example, the display control unit 53 displays the image during capturing on the display 11 based on the display image signals generated by the signal processing unit 33 during the normal imaging mode. In the remote imaging mode, the display control unit 53 turns off the display 11.

In the control unit 35, a function unit that performs other processes is achieved. The process other than the processes conducted by the mode setting unit 51, the command execution unit 52, and the display control unit 53 is performed by the control unit 35.

The input unit 36 detects the operation of the user relative to the operation key provided in each unit of the main body of the imaging machine 1, and outputs the signals corresponding to the user operation to the control unit 35.

The sensor unit 37 is formed by an acceleration sensor, a gyro sensor, or the like. The sensor unit 37 detects the acceleration or the like and outputs signals representing the detection result to the control unit 35. The control unit 35 determines whether the imaging machine 1 is operated or not based on the detection results from the sensor unit 37.

The wireless communication unit 38 includes an antenna, a modulation/demodulation circuit, and the like, and wirelessly communicates with the operating machine 2 as an external appliance in accordance with the control by the control unit 35. The wireless communication unit 38 receives the information such as the control command transmitted from the operating machine 2, and outputs the information to the control unit 35. Upon the reception of the information such as the monitor image from the control unit 35, the wireless communication unit 38 transmits the information to the operating machine 2.

The display 11 is formed by an LCD (Liquid Crystal Display) or the like, and displays the image based on the display image signals supplied from the signal processing unit 33. The display 11 displays the menu image or the like in combination with the image during capturing in accordance with the control by the control unit 35.

<Structure Example of Operating Machine 2>
[Structure of External Appearance]

Figure 5:
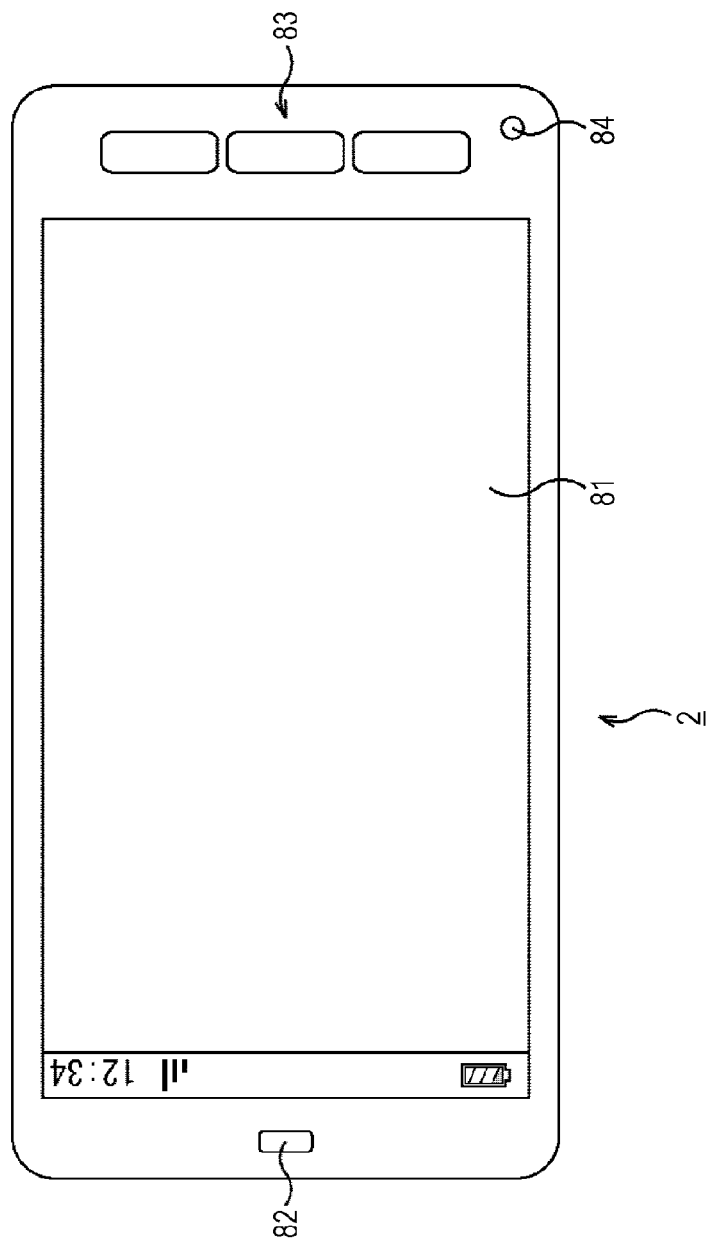
FIG. 5 is a diagram illustrating a structure example of a front surface of an operating machine.

FIG. 5 is a diagram illustrating a structure example of a front surface of the operating machine 2.

The front surface of the operating machine 2 having an approximately rectangular thin-plate shaped housing is provided a display 81 almost entirely. The display 81 has a touch panel stacked thereon, for example. As illustrated in FIG. 5, a user can operate the operating machine 2 while holding the machine sideways.

Upper and lower ends of the front surface of the operating machine 2 (left and right ends in the direction of FIG. 5) respectively have a speaker 82 and three operation keys 83 in the center. A microphone 84 is provided next to the operation keys 83. The speaker 82 and the microphone 84 are used for the conversation. During the remote operation mode, the notification to the user is made using the sound from the speaker 82. The sound collected by the microphone 84 is transmitted to the imaging machine 1 and the output from the speaker 39 of the imaging machine 1.

[Internal Structure]

Figure 6:
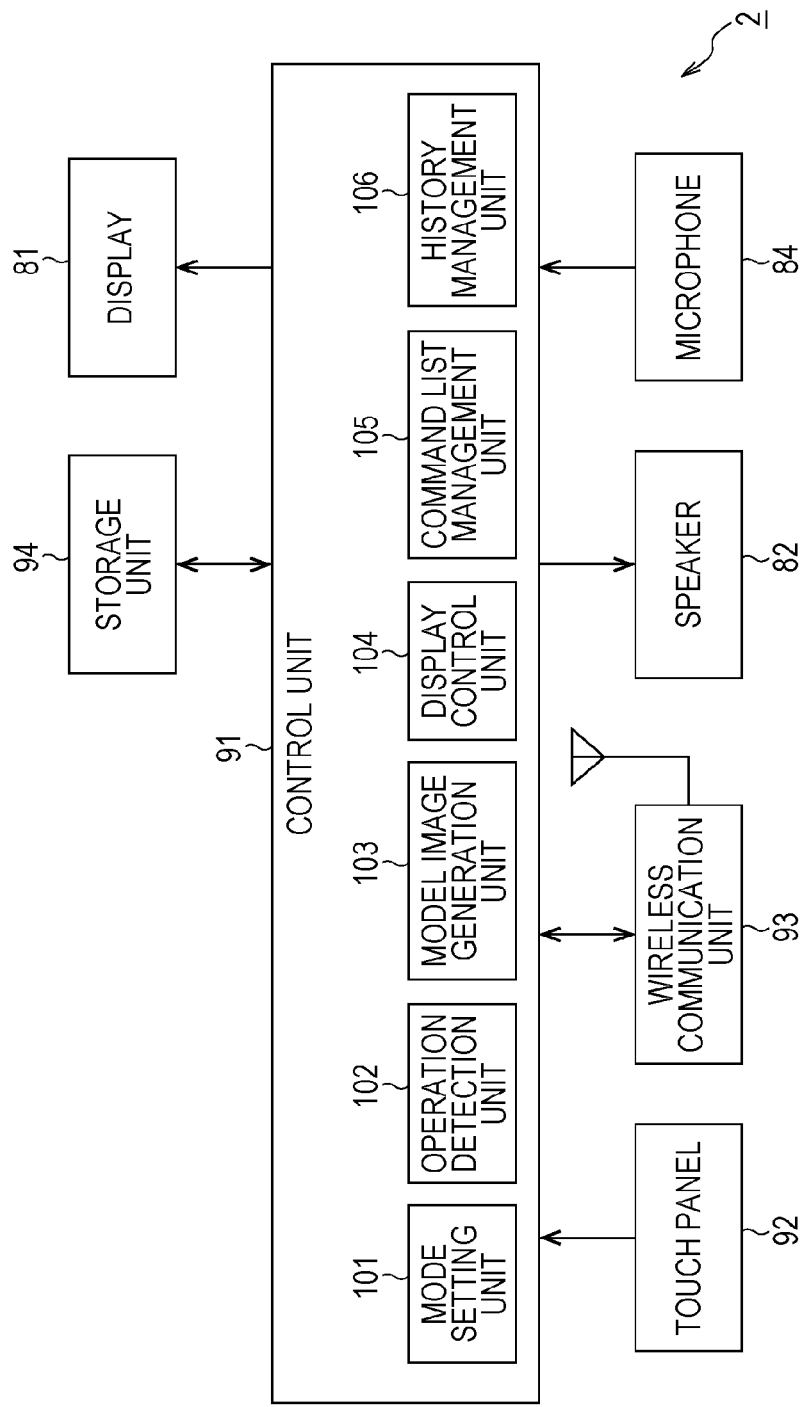
FIG. 6 is a block diagram illustrating a structure example of the operating machine.

FIG. 6 is a block diagram illustrating a structure example of the operating machine 2.

The operating machine 2 includes the display 81, the speaker 82, the microphone 84, a control unit 91, a touch panel 92, a wireless communication unit 93, and a storage unit 94. The optical unit 31, the imaging unit 32, and the like of the imaging machine 1 may be provided with the operating machine 2 and the imaging function may be prepared in the operating machine 2.

The control unit 91 is a microcomputer having a CPU and a memory such as a ROM or a RAM. The control unit 91 controls the entire operation of the operating machine 2 by executing the programs stored in the memory.

As illustrated in FIG. 6, a mode setting unit 101, an operation detection unit 102, a model image generation unit 103, a display control unit 104, a command list management unit 105, and a history management unit 106 are achieved by executing a predetermined program in the control unit 91.

The mode setting unit 101 manages the operation mode of the operating machine 2.

The operation detection unit 102 detects the contact operation of the user based on the signals supplied from the touch panel 92. For example, when the contact operation on the model image is detected by the operation detection unit 102, the display of the model image is changed. Further, when the contact operation on the operation key image on the model image is detected by the operation detection unit 102, the control command is transmitted to the imaging machine 1.

The model image generation unit 103 generates the model image based on the information transmitted from the imaging machine 1 during the remote operation mode.

The display control unit 104 controls the display of the display 81. For example, in the remote operation mode, the display control unit 104 displays the monitor image, which is transmitted from the imaging machine 1 and received by the wireless communication unit 93, and the model image generated by the model image generation unit 103 side by side on the same screen on the display 81.

The command list management unit 105 manages the control command list transmitted from the imaging machine 1. The control command list is transmitted from the imaging machine 1 after, for example, the remote operation mode is set and the communication with the imaging machine 1 is started. The control command list is the list of control commands for causing the imaging machine 1 to perform the operation corresponding to the operation using the operation key image.

The history management unit 106 manages the association information including the history of operations performed by the user in the remote operation mode. Based on the operation history managed by the history management unit 106, the notification to the user for ending the remote operation mode is switched.

In the control unit 91, a function unit that performs other processes is also achieved. The process other than the processes performed by the mode setting unit 101 to the history management unit 106 is performed by the control unit 91.

The touch panel 92 detects the contact operation of the user on the surface of the display 81, and outputs the signals representing the content of the contact operation to the control unit 91.

The wireless communication unit 93 includes an antenna, a modulation/demodulation circuit, and the like, and wirelessly communicates with the imaging machine 1 as an external appliance in accordance with the control by the control unit 91. The wireless communication unit 93 receives the information such as the monitor image transmitted from the imaging machine 1 and outputs the information to the control unit 91. Upon the reception of the information such as the control command from the control unit 91, the wireless communication unit 93 transmits the information to the imaging machine 1.

The storage unit 94 is formed by a flash memory or the like, and stores various pieces of data such as the program to be executed by the control unit 91.

[Control Command List]

FIG. 7 is a diagram illustrating an example of the control command list managed by the command list management unit 105. The association information managed by the history management unit 106 is associated with the control command list.

In the control command list shown in the left side of FIG. 7, the control command number, the control command name, and the automatic restoration flag are associated with the control commands corresponding to the operations using the operation key images.

The automatic restoration flag represents whether the operation key is the operation key that, after the operation, automatically restores to the state before the operation or not. When the automatic restoration flag is 0, the operation key is the operation key that, after the operation, does not restore to the state before the operation automatically (so the key remains in the state after the operation); when the automatic restoration flag is 1, the operation key is the operation key that, after the operation, restores to the state before the operation automatically.

For example, the operation using the mode dial 16 (FIG. 3) provided in the imaging machine 1 includes the clockwise operation and the counterclockwise operation.

In regard to the control command corresponding to the operation of rotating the operation key image representing the mode dial 16 in the clockwise direction, "1" is assigned as the control command number and "mode dial (clockwise)" is assigned as the control command name. Moreover, a numeral of "0" is set as the automatic restoration flag.

On the other hand, in regard to the control command corresponding to the operation of rotating the operation key image representing the mode dial 16 in the counterclockwise direction, "2" is assigned as the control command number and "mode dial (counterclockwise)" is assigned as the control command name. Moreover, a numeral of "0" is set as the automatic restoration flag.

The operation using the shutter key 20 provided for the imaging machine 1 includes a half-pressing operation and a fully-pressing operation.

In regard to the control command corresponding to the half-pressing operation of the shutter key 20, "3" is assigned as the control command number and "shutter key (half press)" is assigned as the control command name. Moreover, a numeral of "1" is set as the automatic restoration flag.

In regard to the control command corresponding to the fully-pressing operation of the shutter key 20, "4" is assigned as the control command number and "shutter key (fully press)" is assigned as the control command name. Moreover, a numeral of "1" is set as the automatic restoration flag.

In the control command list, each piece of information is associated similarly with the control command corresponding to the operation using another operation key image.

The association information shown in the right side of FIG. 7 includes the position coordinate and the operation history.

The position coordinate represents the display position of each operation key image in the display coordinate of the model image. The history management unit 106 updates the coordinate of each operation key image every time the direction or size of the model image is changed by the slide operation or pinching operation.

In the example of FIG. 7, the position of the operation key image representing the mode dial 16 on the model image is expressed by "x1, y1". The operation history of the operation of rotating the operation key image representing the mode dial 16 in the clockwise direction is set to "0" and the operation history of rotating the operation key image in the counterclockwise direction is set to "1". That the operation history of rotating the operation key image in the counterclockwise direction is "1" refers to the fact that the operation of rotating the operation key image representing the mode dial 16 in the counterclockwise direction is carried out only once.

Moreover, the position of the operation key image representing the shutter key 20 on the model image is expressed by "x2, y2", and the operation history of the half-pressing operation and the fully-pressing operation is set to "0".

In this manner, in the operating machine 2, the control command list and the association information including the coordinate position and the operation history are managed in the remote operation mode.

<Operation of Imaging Machine 1 and Operating Machine 2>

[Communication Start Process]

First, the process of the imaging machine 1 and the operating machine 2 for starting the communication is described with reference to the flowchart of FIG. 8.

Figure 9:
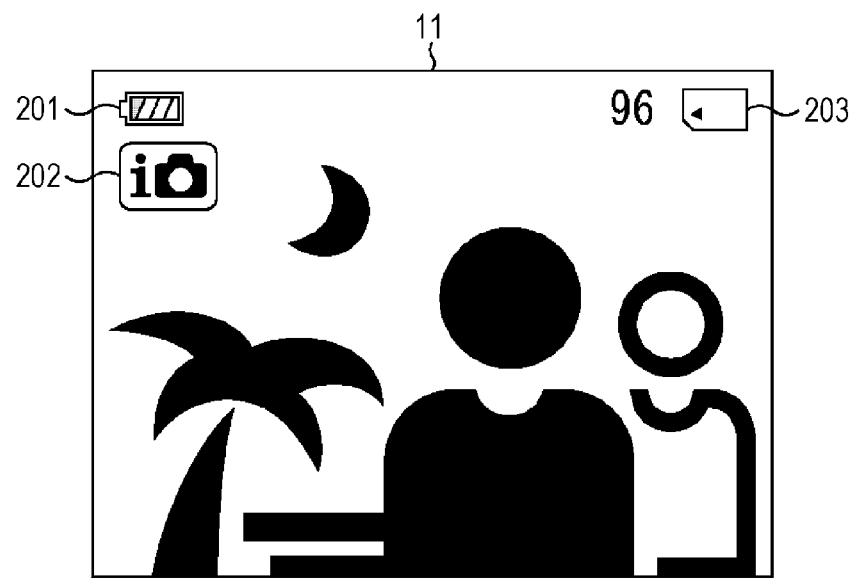
FIG. 9 is a diagram illustrating a display example of an image during capturing.

Before the start of the communication, the display 11 of the imaging machine 1 in which the normal imaging mode is set displays the image during capturing as illustrated in FIG. 9. In the display 11, an icon 201 representing the remaining battery, an icon 202 representing the imaging mode, and an icon 203 representing the number of photos that can be taken are displayed as the information representing the state of the imaging machine 1 in the state of being overlapped on the image during capturing.

Figure 10:
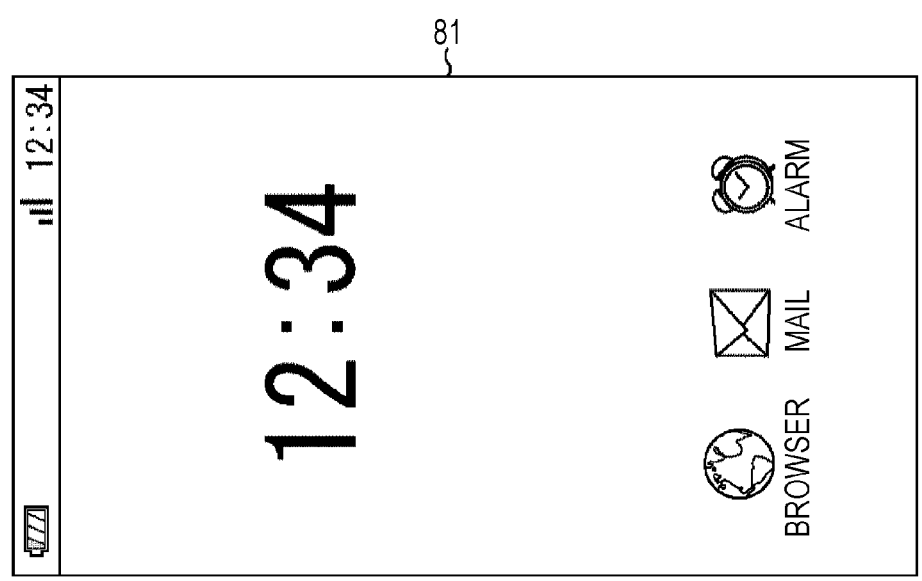
FIG. 10 is a diagram illustrating a display example of a standby image.

On the other hand, the display 81 of the operating machine 2 displays the standby image as illustrated in FIG. 10.

If, in this state, the user has switched the operation mode from the normal imaging mode to the remote imaging mode, the mode setting unit 51 of the imaging machine 1 sets the remote imaging mode in Step S1.

Figure 11:
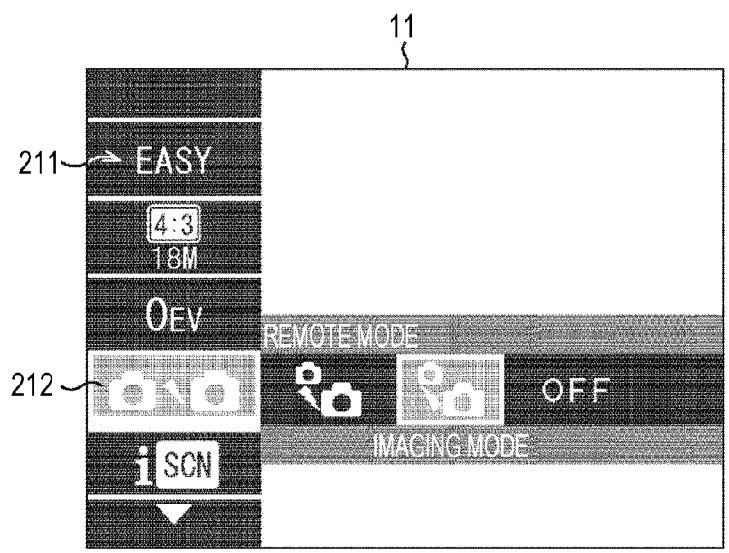
FIG. 11 is a diagram illustrating an example of a screen of setting the operation mode of the imaging machine.

FIG. 11 is a diagram illustrating an example of a screen of setting the operation mode of the imaging machine 1.

When the menu key 14 provided for the rear surface of the imaging machine 1 (FIG. 2) is pressed, a menu image 211 containing icons representing the setting items arranged vertically is displayed on the left end of the display 11. The user can switch the operation mode from the normal imaging mode to the remote imaging mode by selecting an item 212, which is the setting item related to the operation mode, by operating the selection key 12, for example.

On the other hand, if the user has selected the remote operation mode as the operation mode of the operating machine 2, the mode setting unit 101 of the operating machine 2 sets the remote operation mode in Step S21.

Figure 12:
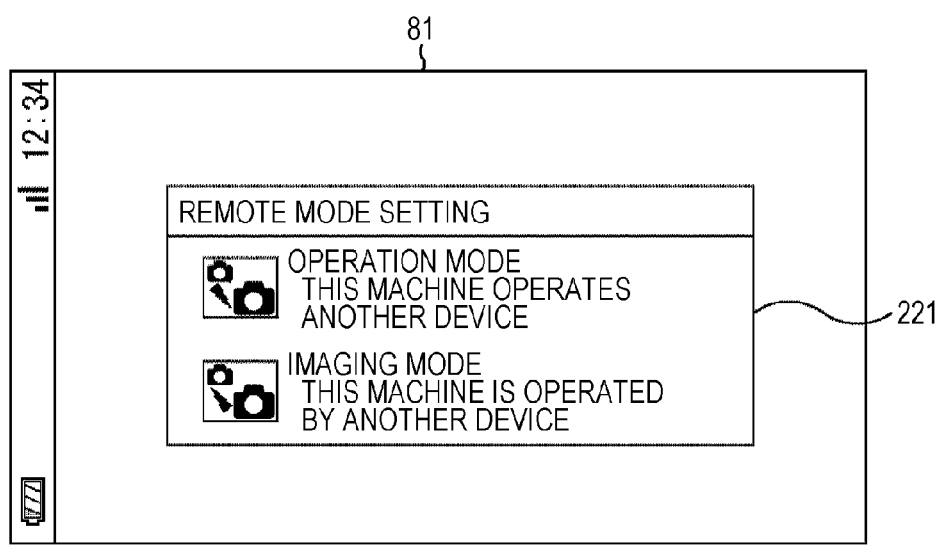
FIG. 12 is a diagram illustrating an example of a screen of setting the operation mode of the operating machine.

FIG. 12 is a diagram illustrating an example of a screen of setting the operation mode of the operating machine 2.

Upon a predetermined operation in the state that the standby image is displayed, the display 81 displays a remote mode setting image 221. In the remote mode setting image 221, the icon representing the remote operation mode and the icon representing the remote imaging mode are displayed. The user can switch the operation mode of the operating machine 2 to the remote operation mode by touching the icon representing the remote operation mode.

When the remote operation mode is set, in Step S22, the control unit 91 of the operating machine 2 transmits the operating machine information by controlling the wireless communication unit 93 to search for the appliance in which the remote imaging mode is set.

The operating machine information includes, for example, the appliance ID corresponding to the identification information of the operating machine 2, the time, the current location, and the information of the functions. Note that the information on the current location may be transmitted from the operating machine 2 to the imaging machine 1 if a predetermined condition is satisfied, for example, the imaging machine 1 does not have the function of acquiring the current location but the operating machine 2 does. In this case, the information on the current location transmitted to the imaging machine 1 can be used to add the position information to the captured image.

In Step S2, the control unit 35 of the imaging machine 1 determines whether the operating machine information has been transmitted or not. If it has been determined that the operating machine information is not transmitted in Step S2, the control unit 35 determines whether the timeout has occurred or not in Step S3; if it has been determined that the timeout does not occur, the processes of and after Step S1 are repeated.

If it has been determined that the timeout has occurred in Step S3, the display control unit 53 causes the display 11 to display the message notifying that the communication has been failed and ends the process in Step S4.

On the other hand, if it has been determined that the operating machine information is transmitted in Step S2, the control unit 35 receives the operating machine information and registers the operating machine 2 by, for example, storing the information in the storage unit 34 in Step S5.

After the registration of the operating machine 2, in Step S6, the control unit 35 transmits the imaging machine information to the operating machine 2. The imaging machine information includes, for example, the appliance ID corresponding to the identification information of the imaging machine 1, the control command list, and the information of the function. As described later, the information related to the shape of the imaging machine 1 and the arrangement of the operation keys may be included in the imaging machine information.

In Step S23, the control unit 91 of the operating machine 2 determines whether the imaging machine information has been transmitted or not. If it has been determined that the imaging machine information is not transmitted in Step S23, the control unit 91 determines whether the timeout has occurred or not in Step S24; if it has been determined that the timeout does not occur, the processes of and after Step S21 are repeated.

If it has been determined that the timeout has occurred in Step S24, the display control unit 104 causes the display 81 to display the message notifying that the communication has been failed and ends the process in Step S25.

On the other hand, if it has been determined that the imaging machine information is transmitted in Step S23, the control unit 91 receives the imaging machine information and registers the imaging machine 1 by, for example, storing the information in the storage unit 94 in Step S26.

After the registration of the imaging machine 1, in Step S27, the control unit 91 transmits to the operating machine 2 the request of transmitting the monitor image. The request of transmitting the monitor image is the information representing the request of transmitting the image of FIG. 9 displayed on the display 11 of the imaging machine 1, which is obtained by overlapping the various icons on the image during capturing, at an appropriate frame rate. In other words, the transmission of the image displayed on the display 11 of the imaging machine 1 is requested from the operating machine 2 to the imaging machine 1.

In Step S7, the control unit 35 of the imaging machine 1 receives the request of transmitting the monitor image. In Step S8, the control unit 35 generates the data of the monitor image based on the image signals supplied from the signal processing unit 33 and starts to transmit the monitor image.

Figure 13:
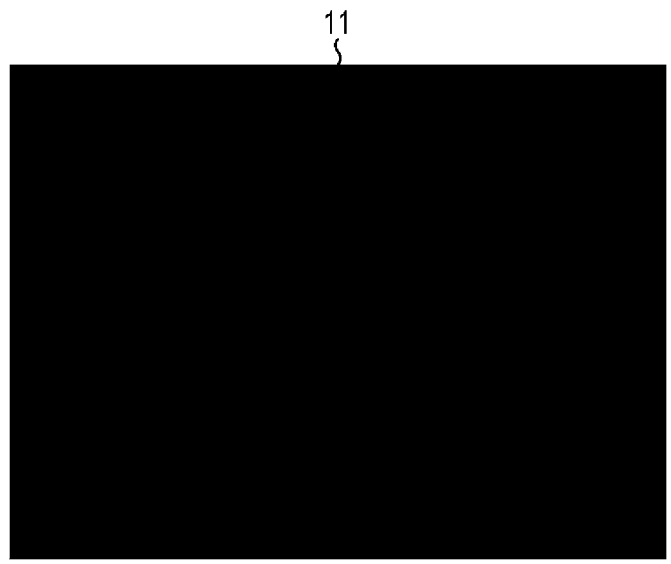
FIG. 13 is a diagram illustrating a display example of a display of the imaging machine.

After the start of the transmission of the monitor image, in Step S9, the display control unit 53 turns off the display 11 as illustrated in FIG. 13. Thus, the consumption power of the imaging machine 1 can be suppressed.

In Step S28, the control unit 91 of the operating machine 2 starts to receive the monitor image.

In Step S29, the model image generation unit 103 performs a model image generation process. The model image generation process refers to the process of generating the model image based on the imaging machine information transmitted from the imaging machine 1.

For example, the operating machine 2 has a database in which the appliance ID and the data of the model image are associated with each other. The model image generation unit 103 acquires the data of the model image corresponding to the appliance ID included in the imaging machine information transmitted from the imaging machine 1 from the database, and generates the model image based on the acquired data. The details of the model image generation process will be described below.

In Step S30, the display control unit 104 displays the monitor image transmitted from the imaging machine 1 and the model image generated by the model image generation unit 103 on the same screen.

Figure 14:
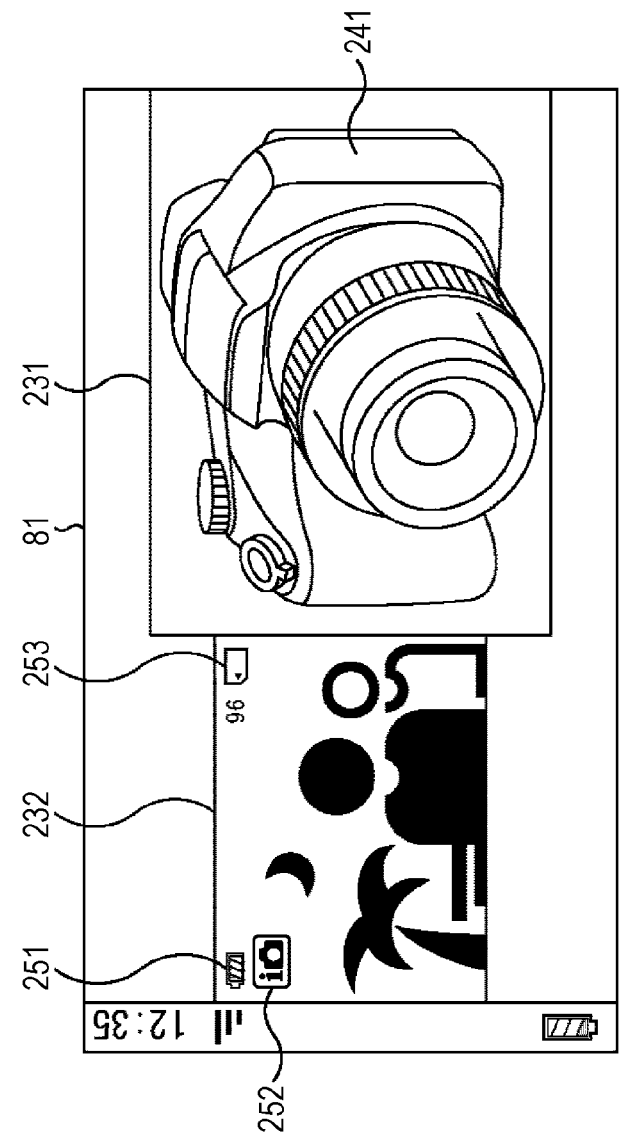
FIG. 14 is a diagram illustrating an example of a remote operation screen displayed on the operating machine.

FIG. 14 is a diagram illustrating an example of the remote operation screen displayed on the display 81.

On the right side of the remote operation screen, a model image region 231 is formed; on the left side thereof, a monitor image region 232 is formed. The model image region 231 is a display region of the model image while the monitor image region 232 is a display region of the monitor image. The model image region 231 and the monitor image region 232 are a rectangular region with a fixed aspect ratio, for example, and in the example of FIG. 14, the model image region 231 is larger than the monitor image region 232.

In the model image region 231, a model image 241 representing the external appearance of the imaging machine 1 viewed from a direction a little oblique to the front is displayed. In the monitor image region 232, the same image as the image in FIG. 9, which is transmitted from the imaging machine 1, is displayed as the monitor image.

As illustrated by the monitor image region 232, the monitor image is the image obtained by overlapping an icon 251 representing the remaining battery of the imaging machine 1, an icon 252 representing the imaging mode, and an icon 253 representing the number of photographs that can be taken on the image during capturing. The icons 251 to 253 respectively correspond to the icons 201 to 203 of FIG. 9 overlapped on the image during capturing in the imaging machine 1.

The communication start process ends after the display 11 of the imaging machine 1 is turned off and the remote operation screen is displayed in the operating machine 2.

Figure 15:
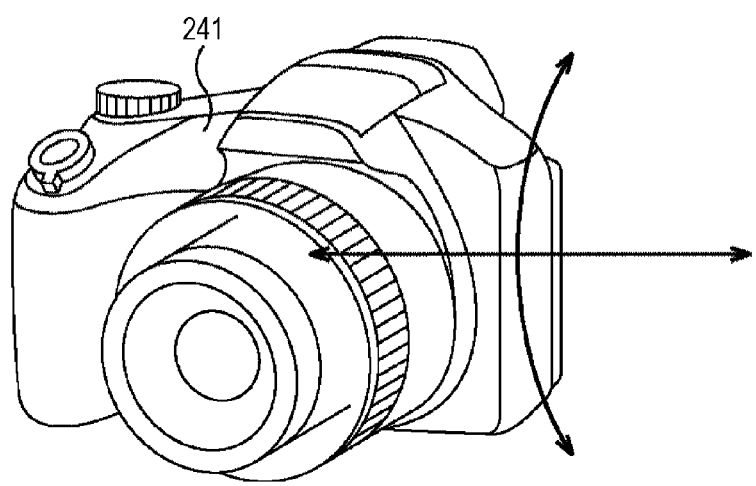
FIG. 15 is a diagram for describing a model image displayed on the remote operation screen.

FIG. 15 is a diagram for describing the model image 241 displayed on the remote operation screen.

The model image 241 is the image representing the external appearance of the imaging machine 1 stereoscopically. The user can change the direction of the model image 241 by sliding the model image 241 displayed on the display 81 as indicated by a thick arrow.

For example, upon the slide operation in the upward direction, the direction of the imaging machine 1, which is expressed by the model image 241, is changed so that the front surface faces upward based on the amount of slide. The model image 241 in which the bottom surface of the imaging machine 1 is viewed is displayed.

Moreover, upon the slide operation in the right direction, the direction of the imaging machine 1, which is expressed by the model image 241, is changed so that the front surface faces in the right direction based on the amount of slide. The model image 241 in which the left side surface of the imaging machine 1 is viewed is displayed.

FIG. 16 to FIG. 19 are diagrams illustrating examples in which the direction of the model image 241 is changed.

Figure 16:
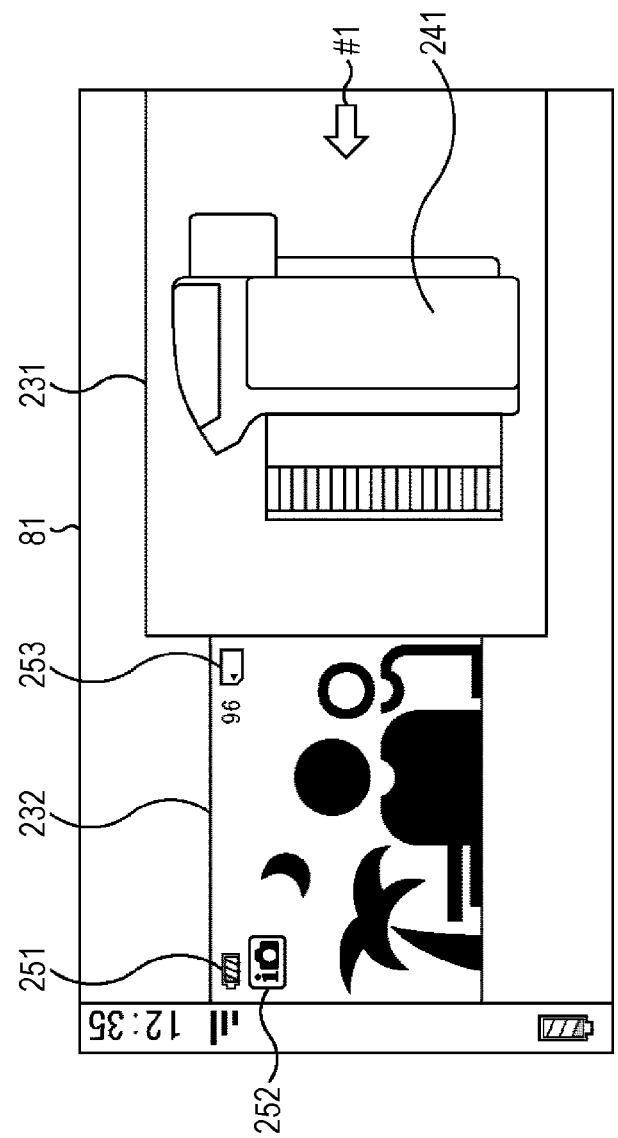
FIG. 16 is a diagram illustrating an example of a change in direction of the model image.

For example, when the user touches the model image 241 in the state of FIG. 14 and slides the image in the left direction as indicated by a white arrow #1 in FIG. 16, the direction is changed based on the amount of slide; as illustrated in FIG. 16, the model image 241 shows the external appearance of the right side surface of the imaging machine 1.

Figure 17:
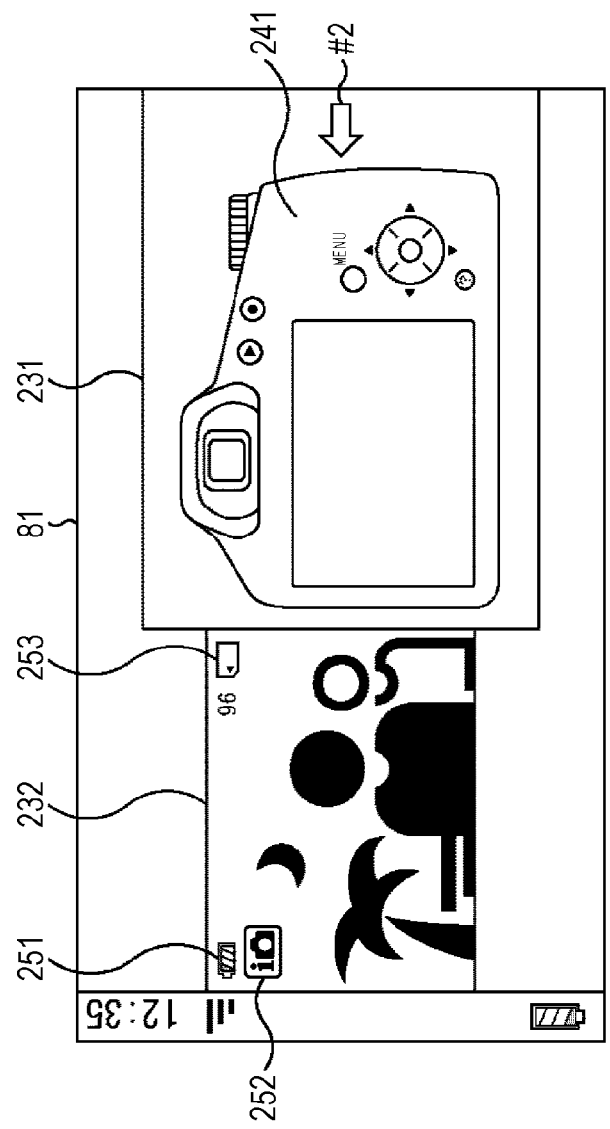
FIG. 17 is a diagram illustrating an example of a change in direction of the model image.

When the user touches the model image 241 in the state of FIG. 16 and slides the image in the left direction as indicated by a white arrow #2 in FIG. 17, the direction is changed based on the amount of slide; as illustrated in FIG. 17, the model image 241 shows the external appearance of the rear surface of the imaging machine 1.

Figure 18:
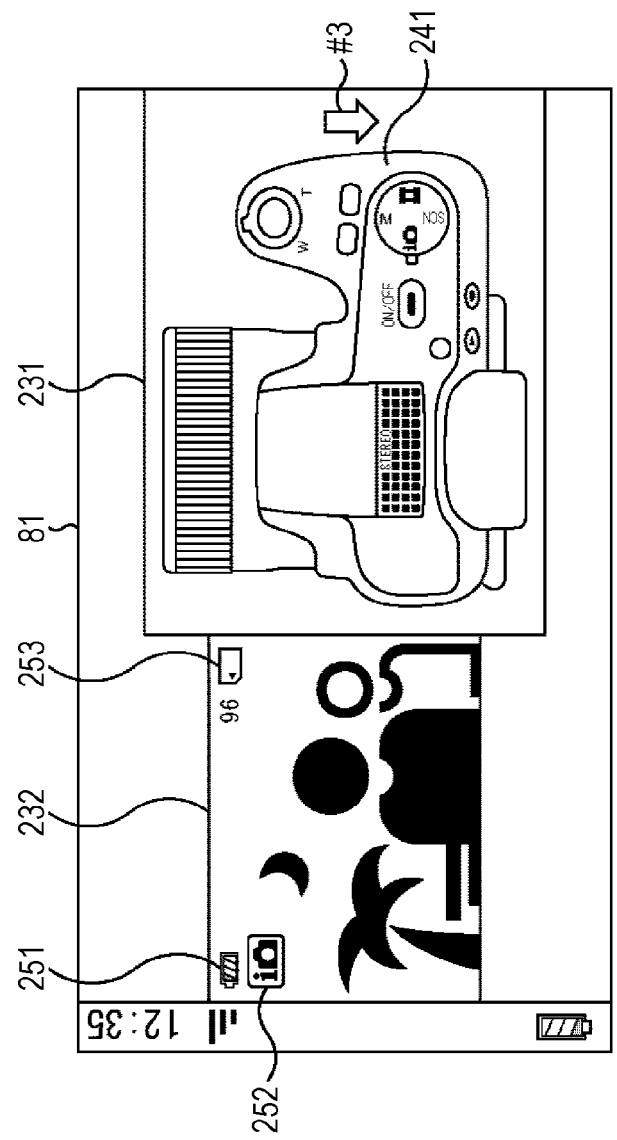
FIG. 18 is a diagram illustrating an example of a change in direction of the model image.

Further, when the user touches the model image 241 in the state of FIG. 17 and slides the screen in the downward direction as indicated by a white arrow #3 in FIG. 18, the direction is changed based on the amount of slide; as illustrated in FIG. 18, the model image 241 shows the external appearance of the top surface of the imaging machine 1.

The direction of the model image 241 can be changed not just by the slide operation in the horizontal or vertical direction but also by the slide operation in the oblique direction.

Figure 19:
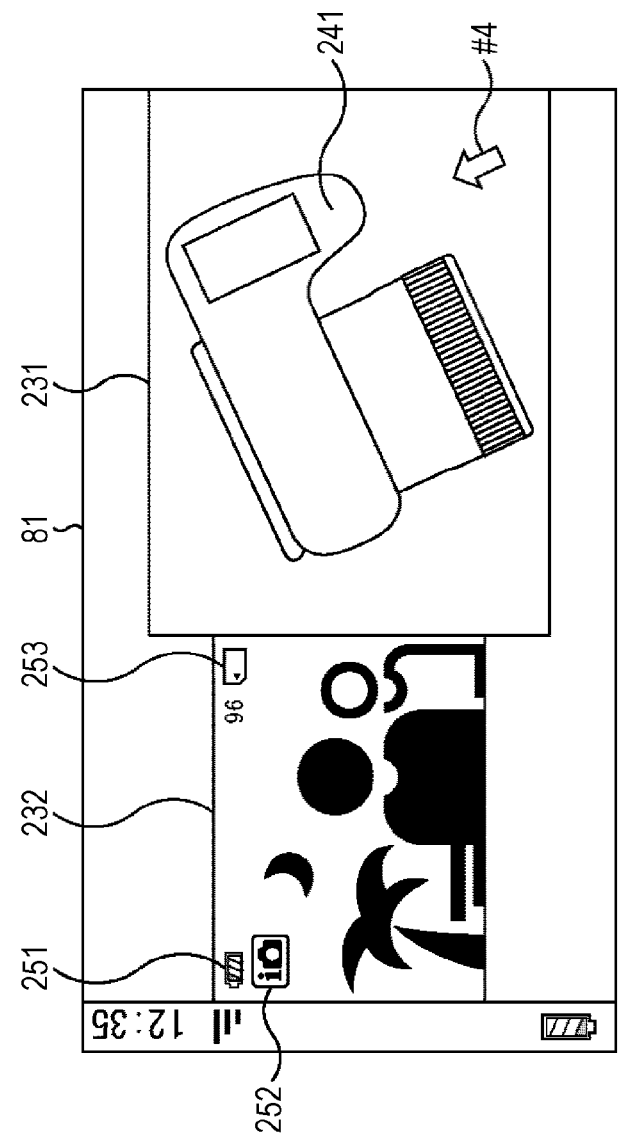
FIG. 19 is a diagram illustrating an example of a change in direction of the model image.

For example, when the user touches the model image 241 in the state of FIG. 18 and slides the image in the obliquely left upward direction as indicated by a white arrow #4 in FIG. 19, the direction is changed based on the amount of slide; as illustrated in FIG. 19, the model image 241 shows the external appearance of the bottom surface of the imaging machine 1. The state of the model image 241 displayed in the model image region 231 in FIG. 19 is the state in which the lens unit faces in the obliquely right downward direction.

In this manner, the model image 241 can be rotated freely by the contact operation of the user on the display 81. Moreover, the model image 241 can be magnified by the pinch-out operation and the model image 241 can be reduced in size by the pinch-in direction.

[Imaging Process]

Figure 20:
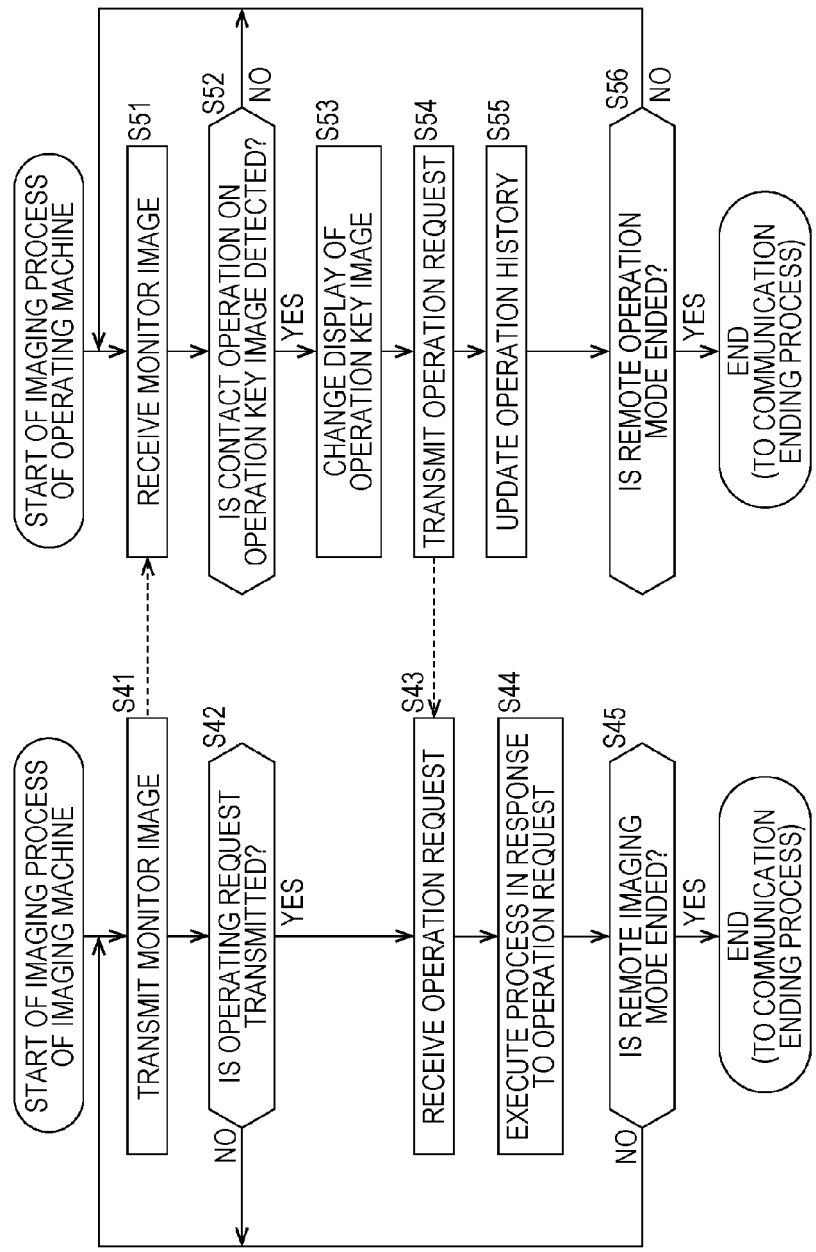
FIG. 20 is a flowchart for describing the imaging process.

Next, description is made of the process of the imaging machine 1 and the operating machine 2 that perform various processes including the image capture in response to the user operation with reference to the flowchart of FIG. 20. The process of FIG. 20 is started after the process of FIG. 8.

In Step S41, the control unit 35 of the imaging machine 1 transmits the monitor image.

In Step S51, the control unit 91 of the operating machine 2 receives the monitor image transmitted from the imaging machine 1. The received monitor image is displayed on the remote operation screen by the display control unit 104.

In Step S52, the command list management unit 105 of the operating machine 2 determines whether the contact operation for the operation key image on the model image 241 has been detected or not.

Upon the contact operation by the user, the operation detection unit 102 detects the position where the contact operation has been performed. The command list management unit 105 checks if the operation key image is present at the position on which the contact operation has been performed, based on the coordinate position included in the association information managed by the history management unit 106. In Step S52, if it has been confirmed that the operation key image is present at the position where the contact operation has been performed, it is determined that the contact operation for the operation key image has been detected.

If it has been determined that the contact operation for the operation key image is performed in Step S52, the display control unit 53 changes the display of the operation key image in Step S53. For example, the display of the operation key image for which the contact operation has been performed is changed to express the state after the operation.

In Step S54, the command list management unit 105 transmits the operation request based on the user operation to the imaging machine 1. The operation request includes the control command of the control command number corresponding to the operation key image for which the contact operation has been performed.

In Step S55, the history management unit 106 updates the operation history. The operation history is updated every time the operation using the operation key image is performed.

After the update of the operation history, in Step S56, the control unit 91 determines whether to end the remote operation mode. If it has been determined that the remote operation mode is not ended in Step S56, the control unit 91 repeats the processes of and after Step S51. Similarly, if it has been determined that the operation for the operation key image is not detected in Step S52, the control unit 91 repeats the processes of and after Step S51. If it has been determined that the remote operation mode is ended in Step S56, the control unit 91 ends the process.

On the other hand, after the transmission of the monitor image, the control unit 35 of the imaging machine 1 determines whether the operation request has been transmitted or not in Step S42.

If it has been determined that the operation request is transmitted in Step S42, the control unit 35 receives the operation request transmitted from the operating machine 2 in Step S43.

In Step S44, the command execution unit 52 recognizes the operation requested by the operating machine 2 with reference to the control command list based on the control command number of the control command included in the operation request, and executes the process in accordance with the operation.

After the execution of the process in response to the operation request, in Step S45, the control unit 35 determines whether to end the remote imaging mode or not. If it has been determined that the remote imaging mode is not ended in Step S45, the control unit 35 repeats the processes of and after Step S41. If it has been determined that the operation request is not transmitted in Step S42, similarly, the processes of and after Step S41 are repeated. If it has been determined that the remote imaging mode is ended in Step S45, the control unit 35 ends the process.

[Specific Example of Control]

Figure 21:
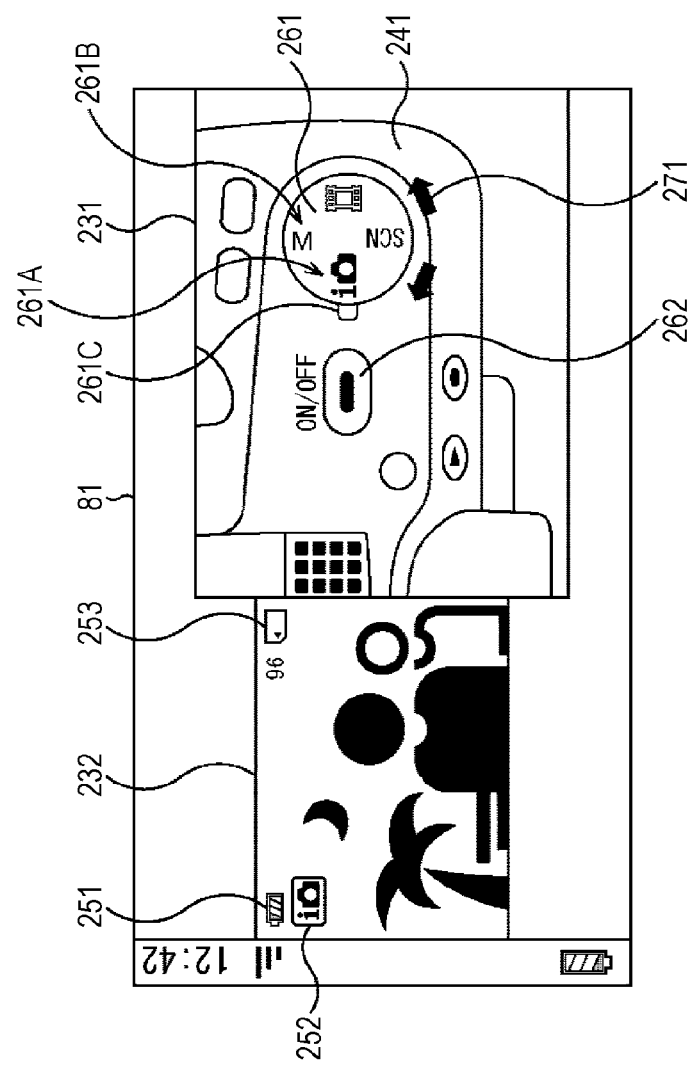
FIG. 21 is a diagram illustrating a specific example of the remote operation.
Figure 22:
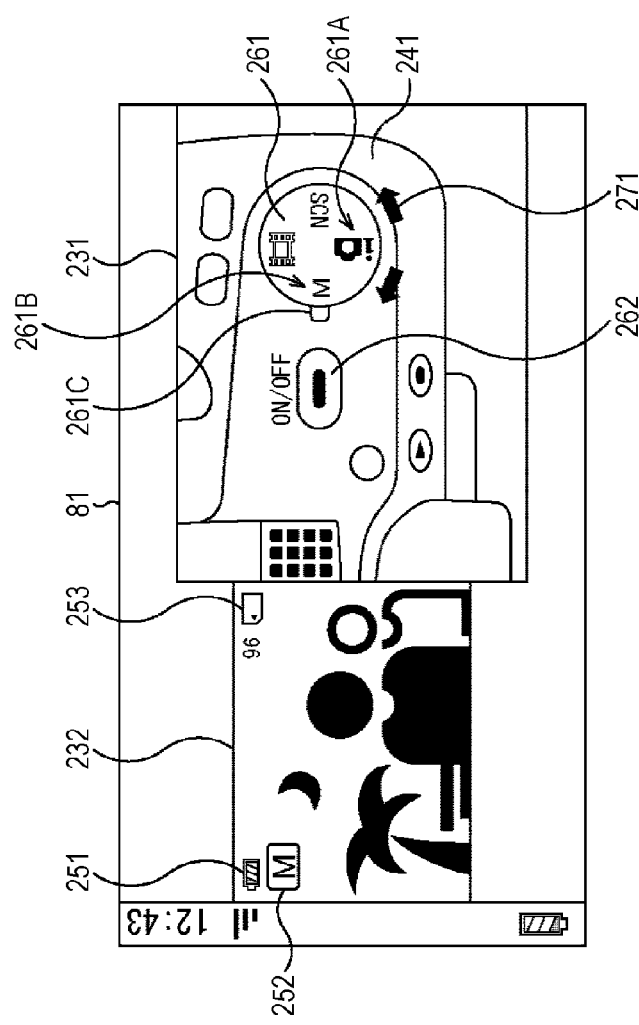
FIG. 22 is a diagram illustrating the specific example of the remote operation, which is subsequent to FIG. 21.
Figure 23:
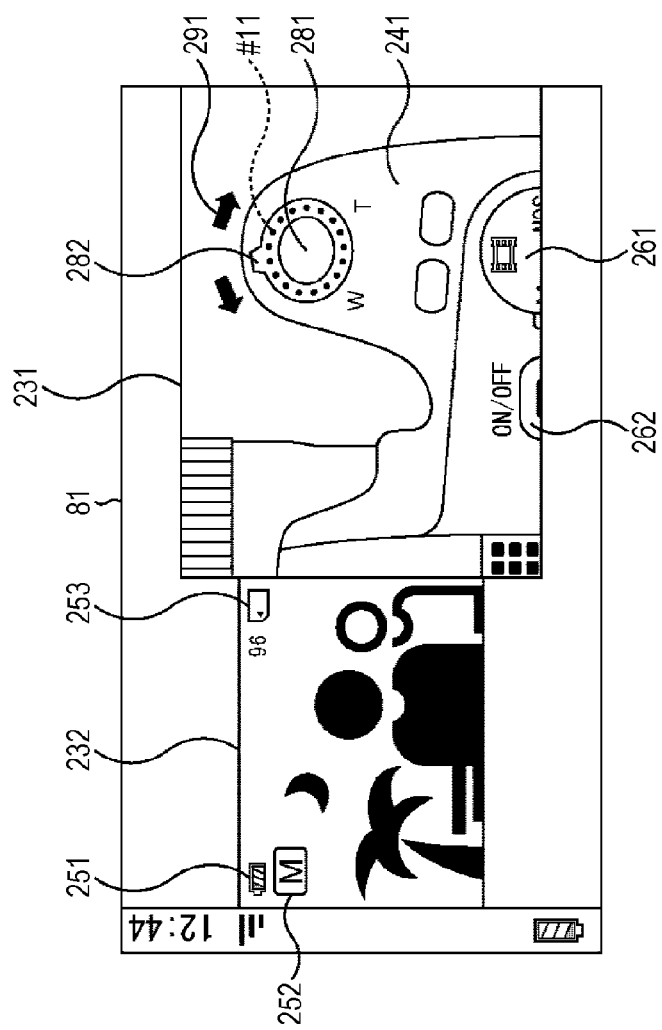
FIG. 23 is a diagram illustrating a specific example of the remote operation.

Description is made of the specific example of the remote operation achieved by the process of FIG. 20, which includes the capture of a still image, with reference to FIG. 21 to FIG. 23.

FIG. 21 and FIG. 22 are diagrams for describing the operation of the mode dial 16. Here, description is made of the case in which the imaging mode of the imaging machine 1 is changed from the auto-mode, which is the initial state, to the manual mode.

The auto-mode is the mode in which the imaging machine 1 automatically decides the optimum setting and the still image is captured in response to the pressing of the shutter key. The manual mode is the mode in which the user manually decides the setting of the shutter speed and the diaphragm, and the still image is captured in response to the pressing of the shutter key.

In the model image region 231 of FIG. 21, the vicinity of the operation key image expressing the mode dial 16 provided on the top surface of the imaging machine 1 is magnified and displayed. For example, when the user pinches-out around the operation key image representing the mode dial 16 in the state that the model image 241 illustrated in FIG. 18 is displayed, the model image 241 in the state illustrated in FIG. 21 is displayed.

The mode dial 16 of the imaging machine 1 is displayed as an operation key image 261 on the model image 241. An icon 261A displayed on the operation key image 261 is the icon representing the auto-mode, while an icon 261B with a letter of M is the icon representing the manual mode. When the icon 261A is present next to a pointer 261C, the current setting of the imaging mode is the auto-mode.

The power source key 17 is displayed as an operation key image 262 on the model image 241. Note that the picture of the icon 252 of the monitor image region 232 is set to the same picture as the icon 261A, which means that the auto-mode is set.

An operation guide 271 notifying that the contact operation of the operation key image 261 is possible in the clockwise direction or the counterclockwise direction is displayed in the vicinity of the operation key image 261. The operation guide 271 is displayed when the user has magnified the operation key image to some extent. This enables the user to easily know how to operate the operation key image.

If the operation detection unit 102 has detected the contact operation in the counterclockwise direction relative to the position expressed by "x1, y1" (FIG. 7) on the model image 241, the command list management unit 105 determines that the contact operation for the operation key image has been performed (Step S52). When the contact operation for the operation key image has been detected, the vibrator of the operating machine 2 may be vibrated to notify the user of the detection of the operation.

As illustrated in FIG. 22, the display control unit 104 changes the display of the operation key image 261 so as to express the state rotated counterclockwise by one stage (Step S53). In the example of FIG. 22, the icon 261B representing the manual mode is displayed next to the pointer 261C.

On this occasion, the picture of the icon 252 in the monitor image region 232 is changed to the same picture as the picture of the icon 261B. The display of the icon 252 is changed when the process in accordance with the operation request is executed by the imaging machine 1 and the monitor image transmitted thereafter is displayed in the monitor image region 232.

In response to the detection of the counterclockwise contact operation of the operation key image 261, the command list management unit 105 transmits the operation request including the control command with a control command number "2" to the imaging machine 1 (Step S54). As aforementioned, the control command with a control command number "2" represents the operation of rotating the mode dial 16 counterclockwise. Moreover, the history management unit 106 updates the operation history and manages that the operation of rotating the mode dial 16 counterclockwise is carried out once (Step S55).

The imaging machine 1 receives the operation request including the control command with a control command number "2" in the command execution unit 52 (Step S43), and recognizes that the operation of rotating the mode dial 16 counterclockwise is requested. The process in accordance with the operation request is executed and the imaging mode is changed from the auto-mode to the manual mode (Step S44).

In this manner, by touching the operation key image 261, the user can cause the imaging machine 1 to perform the operation as if operating the mode dial 16 of the imaging machine 1 directly.

FIG. 23 is a diagram for describing the operation of the shutter key 20.

In the model image region 231 of FIG. 23, the vicinity of the operation key image representing the shutter key 20 provided on the top surface of the grip unit 19 of the imaging machine 1 is magnified and displayed. For example, when the user performs the downward slide operation in the state that the model image 241 illustrated in FIG. 22 is displayed, the model image 241 in the state illustrated in FIG. 23 is displayed.

The shutter key 20 of the imaging machine 1 is displayed as an operation key image 281 on the model image 241, and the zoom key 21 is displayed as an operation key image 282 on the model image 241. An operation guide 291 representing that the contact operation of the operation key image 282 is possible in the clockwise or counterclockwise direction is displayed near the operation key image 282. The operation guide 291 is also displayed when, for example, the user has magnified the operation key image 282 to some extent.

If the first contact operation on the position expressed by "x2, y2" (FIG. 7) on the model image 241 has been detected by the operation detection unit 102, the command list management unit 105 determines that the contact operation for the operation key image has been performed (Step S52).

As shown by a dotted line #11 in FIG. 23, the display control unit 104 changes the display of the operation key image 281 to express the half-pressed state (Step S53). As described above, the shutter key 20 of the imaging machine 1 is the two-step operation key. The shutter key 20 is pressed first for the half-pressed state and then pressed for the second time within a predetermined time for the fully-pressed state.

When the operation key image 281 is half-pressed, a dotted line is displayed around the operation key image 281 or the image itself is changed, for example. The half-pressed state may be expressed by the color change.

Furthermore, in response to the detection of the first contact operation for the operation key image 281, the command list management unit 105 transmits the operation request including the control command with a control command number "3" to the imaging machine 1 (Step S54). The control command with a control command number "3" represents the half-pressing operation of the shutter key 20. In addition, the history management unit 106 updates the operation history and manages that the half-pressing operation of the shutter key 20 is performed once (Step S55).

In the imaging machine 1, the command execution unit 52 receives the operation request including the control command with a control command number "3" (Step S43), and the request of the half-pressing operation of the shutter key 20 is recognized. Moreover, the process in accordance with the operation request is executed and the fixture of the focus or the like is conducted (Step S44).

If the operation detection unit 102 has detected that the second contact operation relative to the position expressed by "x2, y2" on the model image 241 is carried out within the predetermined time, the command list management unit 105 transmits the operation request including the control command with a control command number "4" to the imaging machine 1 (Step S54). The control command with a control command number "4" represents the fully-pressing operation of the shutter key 20. The history management unit 106 updates the operation history, and manages that the fully-pressing operation of the shutter key 20 is conducted once (Step S55).

In the imaging machine 1, the command execution unit 52 receives the operation request including the control command with a control command number "4" (Step S43) and the request of the fully-pressing operation of the shutter key 20 is recognized. Moreover, the process in accordance with the operation request is executed and the still image is captured (Step S44).

The captured still image is transmitted to the operating machine 2 as the monitor image, and displayed in the monitor image region 232 of the remote operation screen. The user can check the captured still image just after the image capture, which is similar to the image capture in the normal imaging mode with the imaging machine 1. After that, the transmission and reception of the monitor image are continued unless the end of the remote imaging mode is instructed by the user (Steps S41, S51).

The captured still image may be not just saved in the imaging machine 1 but also saved in the operating machine 2. In this case, the still image compressed by the signal processing unit 33 is transmitted from the imaging machine 1 to the operating machine 2 for reducing the data quantity, and stored in the storage unit 94 of the operating machine 2.

In this manner, by touching the operation key image 281, the user can operate the imaging machine 1 as if operating the shutter key 20 of the imaging machine 1 directly. Moreover, since the imaging is not performed in the operating machine 2, the hand shake does not occur.

In addition, more intuitive operation can be achieved by matching the operation using the operation key image 281 like the two-step operation including the half-pressing operation and the fully-pressing operation, and the operation using the shutter key 20. The operation key image 281 in the half-pressed state and the operation key image 281 in the fully-pressed state may be displayed in different colors.

As a method of notifying the user of the state of the operation key image 281, for example, the sound may be output from the speaker 82 of the operating machine 2, for example, a beeping sound is output to notify the half-pressed state and a clicking sound is output to notify the fully-pressed state. This similarly applies to the operation of other operation key images than the operation key image 281, and the muffling function is desirably provided.

Figure 24:
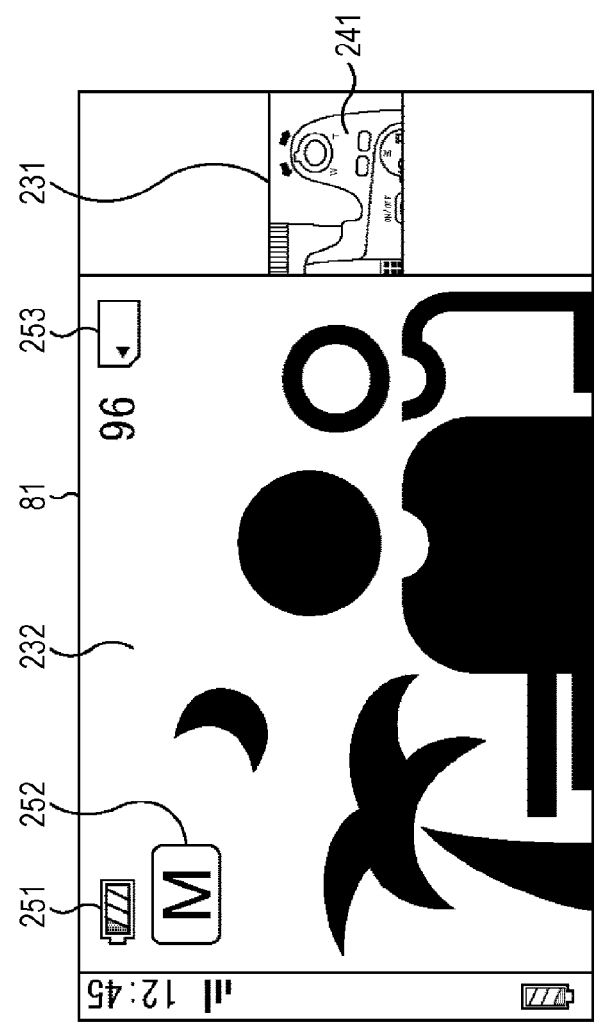
FIG. 24 is a diagram illustrating an example of the remote operation screen.

FIG. 24 is a diagram illustrating an example of the remote operation screen.

Before the image capture using the operation key image 281 or the like, the user can check the viewing angle of the image during capturing by magnifying the monitor image region 232 as illustrated in FIG. 24. As the monitor image region 232 is magnified, the model image region 231 is reduced in size. The model image region 231 and the monitor image region 232 are magnified/reduced when, for example, the user touches the edge of the region and slides the region.

[Warning Process]

Figure 25:
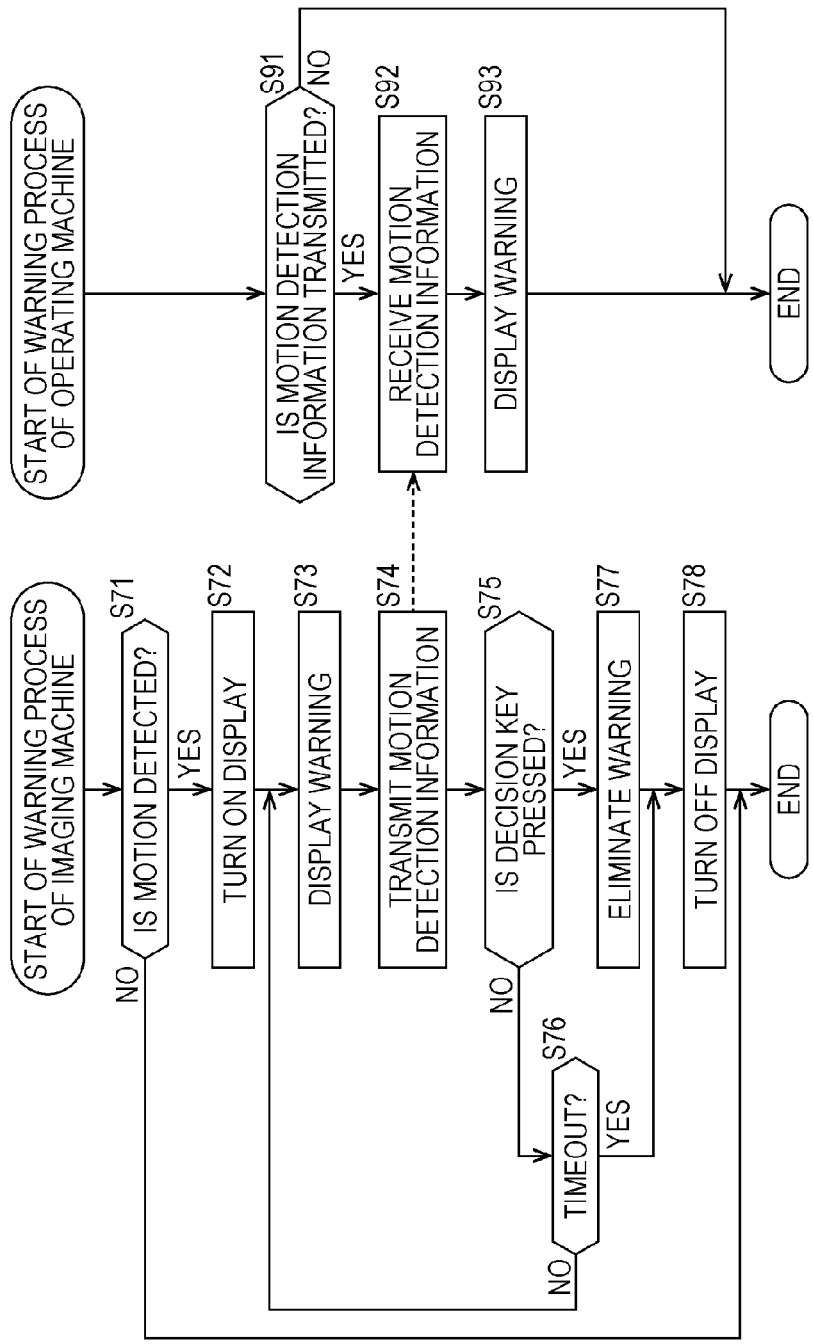
FIG. 25 is a flowchart for describing a warning process.

Next, the process of the imaging machine 1 and the operating machine 2 that output warning upon the detection of the motion in the imaging machine 1 is described with reference to the flowchart of FIG. 25. The process of FIG. 25 is repeated while the process of FIG. 20 is conducted, for example.

For example, when the user has changed the viewing angle of the imaging machine 1 or the imaging machine 1 is carried by another user, the motion is detected by the imaging machine 1 and warning is output from both the imaging machine 1 and the operating machine 2.

In Step S71, the control unit 35 of the imaging machine 1 determines whether the motion has been detected or not based on the output from the sensor unit 37, and if it has been determined that the motion is not detected, the process is ended.

On the other hand, if it has been determined that the motion is detected in Step S71, the display control unit 53 turns on the display 11 in Step S72 and displays warning in Step S73.

Figure 26:
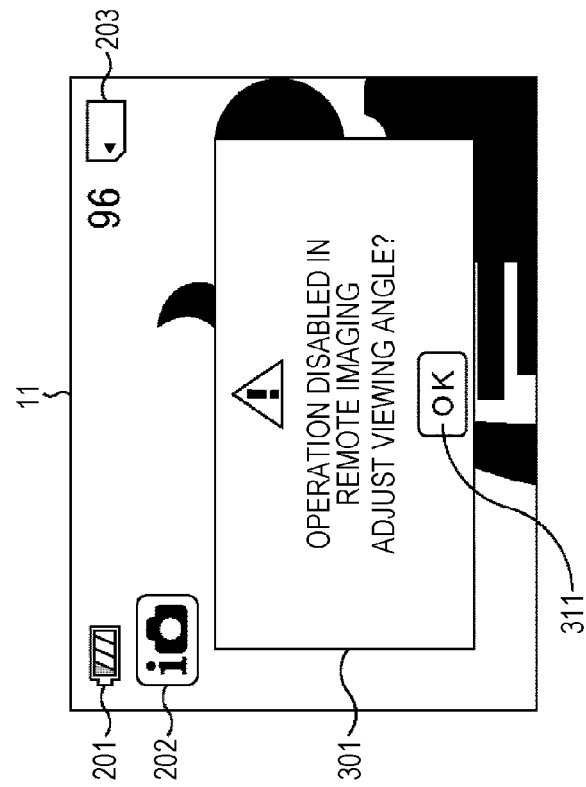
FIG. 26 is a diagram illustrating an example of warning displayed on the imaging machine.

FIG. 26 is a diagram illustrating an example of the warning displayed on the display 11 when the motion has been detected.

As illustrated in FIG. 26, a window 301 containing a message notifying that the image is currently captured remotely, and an OK button 311 is displayed overlapping on the image during capturing. The user can directly operate the imaging machine 1, for example, adjust the viewing angle by pressing the OK button 311.

The warning may be output with a sound from the speaker 39 provided for the imaging machine 1. The sound output from the speaker 39 may be the sound output based on the data recorded in the imaging machine 1 or the voice of the user that is collected by the microphone 84 of the operating machine 2 and transmitted to the imaging machine 1 in real time.

After the warning is displayed, the control unit 35 transmits the motion detection information, which is the information representing that the motion has been detected, to the operating machine 2 in Step S74.

In Step S91, the control unit 91 of the operating machine 2 determines whether the motion detection information has been transmitted from the imaging machine 1 or not; if it has been determined that the information is not transmitted, the process is ended.

On the other hand, if it has been determined that the motion detection information is transmitted in Step S91, the control unit 91 receives the motion detection information transmitted from the imaging machine 1 in Step S92.

In Step S93, the display control unit 104 displays the warning on the display 81.

Figure 27:
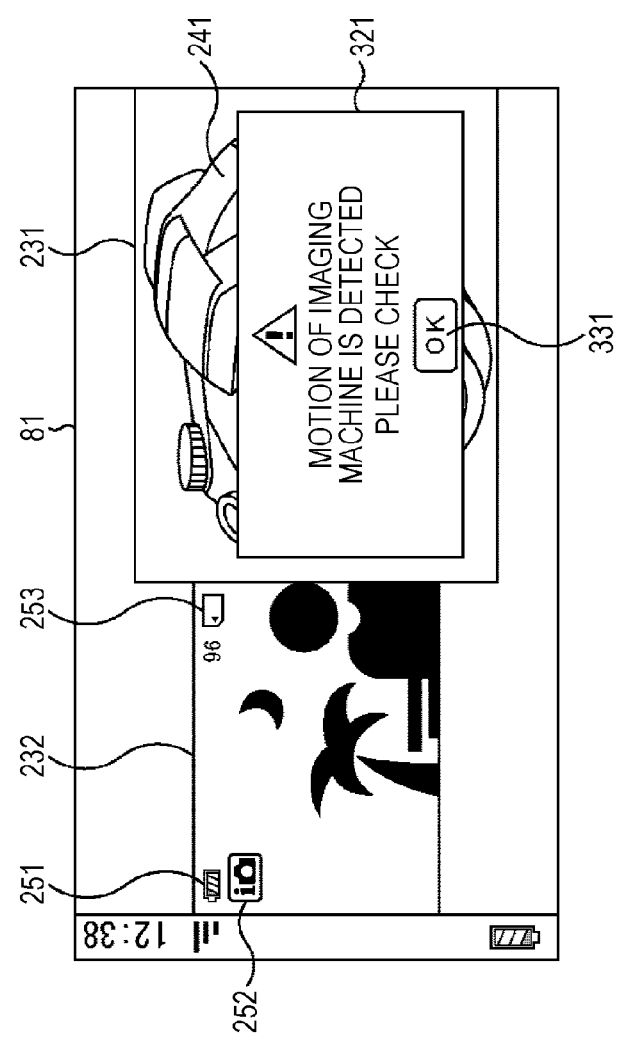
FIG. 27 is a diagram illustrating an example of warning displayed on the operating machine.

FIG. 27 is a diagram illustrating an example of the warning displayed on the display 81 upon the reception of the motion detection information.

In the example of FIG. 27, the viewing angle of the monitor image is displaced by the movement of the imaging machine 1. As illustrated in FIG. 27, a window 321 including a message notifying that the motion has been detected in the imaging machine 1 and an OK button 331 is displayed overlapped on the model image 241. The user can eliminate the display of the window 321 by pressing the OK button 331.

After the transmission of the motion detection information, in Step S75, the control unit 35 determines whether the decision key 13 (FIG. 2) on the rear surface has been pressed and the operation of the OK button 311 has been performed based on the signal input from the input unit 36.

If it has been determined that the decision key 13 is not pressed in Step S75, the control unit 35 determines whether the timeout has occurred or not in Step S76. If it has been determined that the timeout does not occur in Step S76, the control unit 35 continues the processes of and after Step S73.

On the other hand, if it has been determined that the decision key 13 is pressed in Step S75, the display control unit 53 eliminates the display of the warning in Step S77, and the display 11 is returned to the OFF state in Step S78. Similarly, if it has been determined that the timeout has occurred in Step S76, the display 11 is turned off in Step S78.

Returning the display 11 to the OFF state and disabling the direct operation mean that the imaging machine 1 cannot be operated normally unless the communication end process as described below is conducted. Disabling the normal operation is effective in the theft prevention of the imaging machine 1.

By the display of the warning as above, it is possible to prevent the imaging machine 1 from being taken away by another user.

[Communication End Process]

Figure 28:
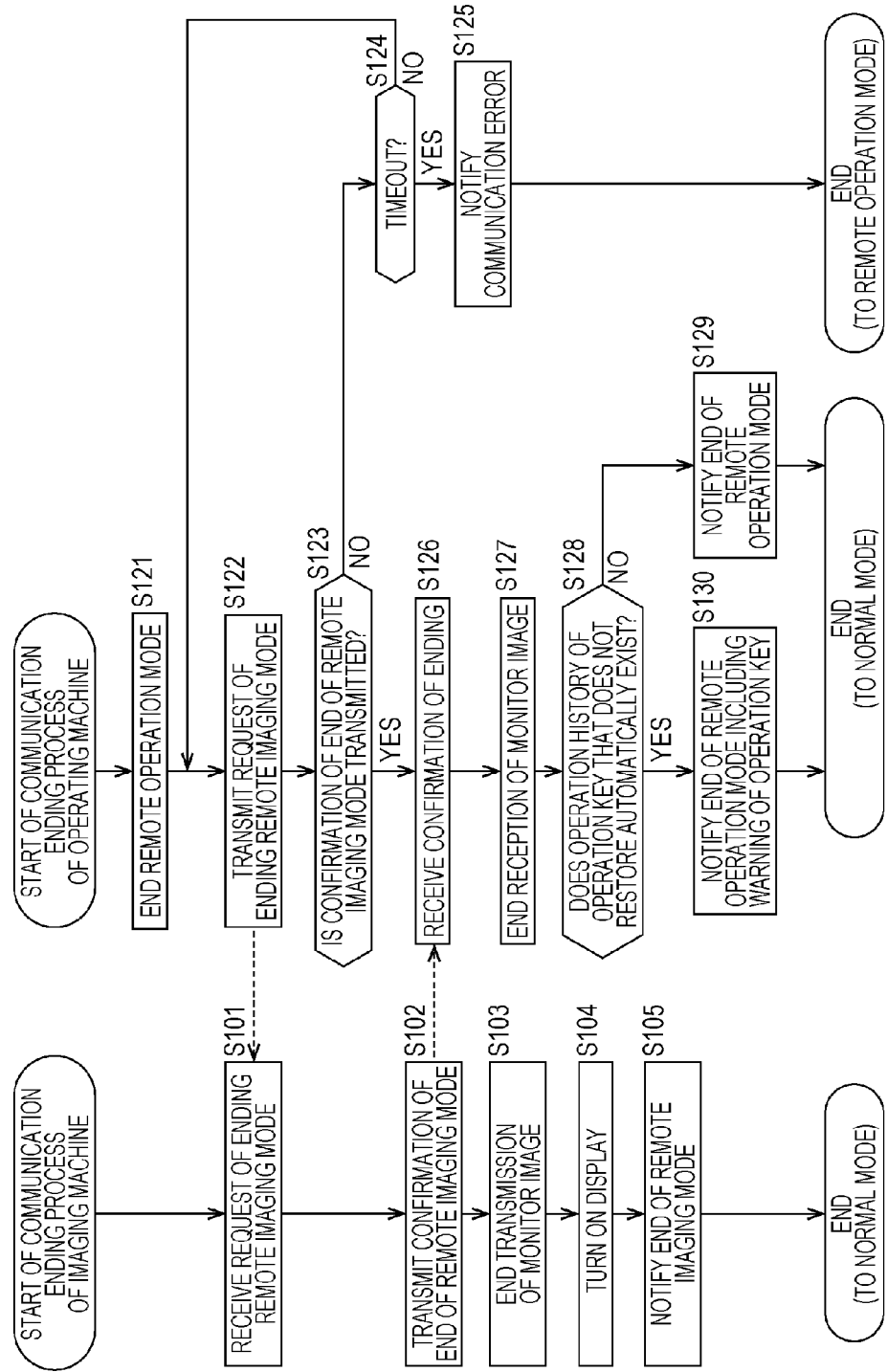
FIG. 28 is a flowchart for describing a communication end process.

The process of the imaging machine 1 and the operating machine 2 for ending the communication is described with reference to the flowchart of FIG. 28.

If the user has operated to end the remote operation mode by using the setting screen of FIG. 12, for example, the mode setting unit 101 of the operating machine 2 ends the remote operation mode in Step S121.

In Step S122, the control unit 91 transmits the request of ending the remote imaging mode to the imaging machine 1.

In Step S101, the control unit 35 of the imaging machine 1 receives the request of ending the remote imaging mode transmitted from the operating machine 2. In Step S102, the control unit 35 transmits the confirmation of the end of the remote imaging mode to the operating machine 2 and in Step S103, the control unit 35 ends the transmission of the monitor image.

In Step S104, the display control unit 53 turns on the display 11 and in Step S105, the display control unit 53 notifies the user of the end of the remote imaging mode by displaying the message, for example.

Figure 29:
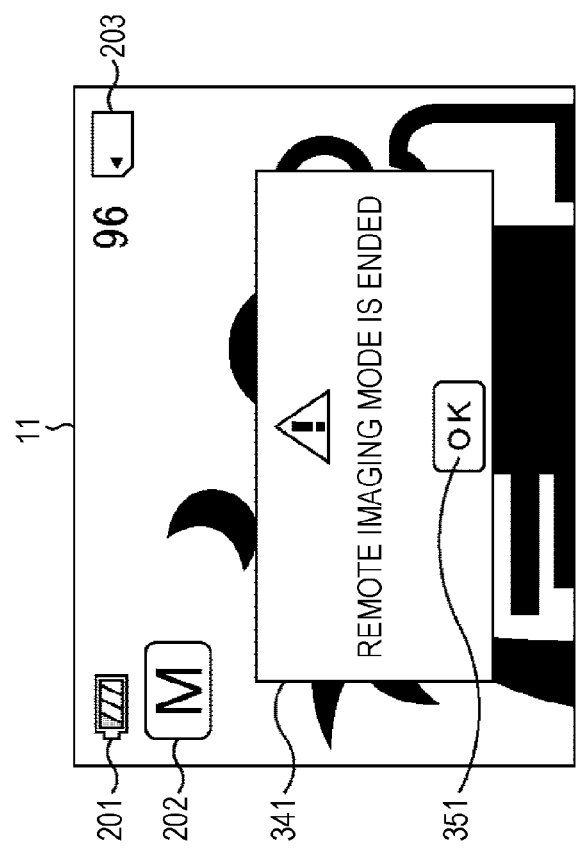
FIG. 29 is a diagram illustrating an example of notifying the end of the remote imaging mode.

FIG. 29 is a diagram illustrating an example of the notification of the end of the remote imaging mode.

In the example of FIG. 29, a window 341 including a message notifying the end of the remote imaging mode and an OK button 351 is displayed overlapped on the image during capturing, which is displayed again. The user can eliminate the display of the window 341 by pressing the OK button 351.

On the other hand, in Step S123, the control unit 91 of the operating machine 2 determines whether the confirmation of the end of the remote imaging mode is transmitted from the imaging machine 1. If it has been determined that the confirmation of the end of the remote imaging mode is not transmitted in Step S123, the control unit 91 determines whether the timeout has occurred or not in Step S124. If it has been determined that the timeout does not occur, the processes of and after Step S122 are repeated.

If it has been determined that the timeout has occurred in Step S124, the display control unit 104 displays the message notifying the error of the communication end on the display 81 and continues the process of the remote operation mode in Step S125.

On the other hand, if it has been determined that the confirmation of the end of the remote imaging mode is transmitted in Step S123, the control unit 91 receives the confirmation of the end of the remote imaging mode in Step S126 and ends the reception of the monitor image in Step S127.

In Step S128, the history management unit 106 determines whether there is the operation history of the operation key that does not restore automatically, i.e., the operation key whose value of the automatic restoration flag (FIG. 7) is 0.

If it has been determined that there is no operation history of the operation key that does not restore automatically in Step S128, the display control unit 104 notifies the user of the end of the remote operation mode and ends the process in Step S129. The display 81 displays the message that notifies the end of the remote operation mode.

On the other hand, if it has been determined that there is the operation history of the operation key that does not restore automatically in Step S128, the display control unit 104 displays the notification including the message that warns the operation key that does not restore automatically in Step S130. For example, in the case where the operation is performed using the operation key image 261 representing the mode dial 16 as described with reference to FIG. 21 and FIG. 22, the message warning the mode dial 16 is displayed.

Figure 30:
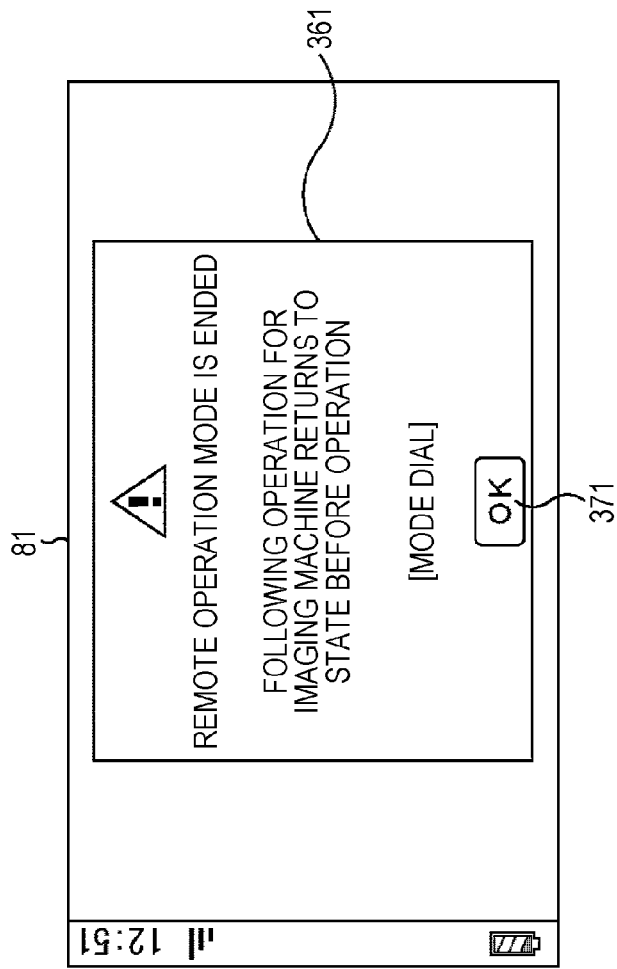
FIG. 30 is a diagram illustrating an example of notifying the end of the remote operation mode.

FIG. 30 is a diagram illustrating an example of the notification of the end of the remote operation mode displayed in Step S130.

In the example of FIG. 30, the remote operation screen displayed on the display 81 is eliminated and a window 361 containing a message and an OK button 371 is displayed. The window 361 displays the message notifying the end of the remote operation mode and the message notifying that the mode dial 16 operated in the remote operation mode has returned to the state before the operation.

In regard to the operation key such as the mode dial 16 that, after the operation, does not restore automatically to the state before the operation, the key in the actual imaging machine 1 remains in the state before the operation even though the user has operated using the operation key image 261. By notifying that the operation key of the imaging machine 1 remains in the state before the remote operation at the end of the remote operation mode, the user can be prevented from directly operating the imaging machine 1 while misunderstanding the setting.

The end of the remote imaging mode or the remote operation mode may be notified by sound. The communication ends when the OK button 351 in the imaging machine 1 in FIG. 29 is operated and the OK button 371 in the operating machine 2 in FIG. 30 is operated.

[Model Image Generation Process]

Figure 8:
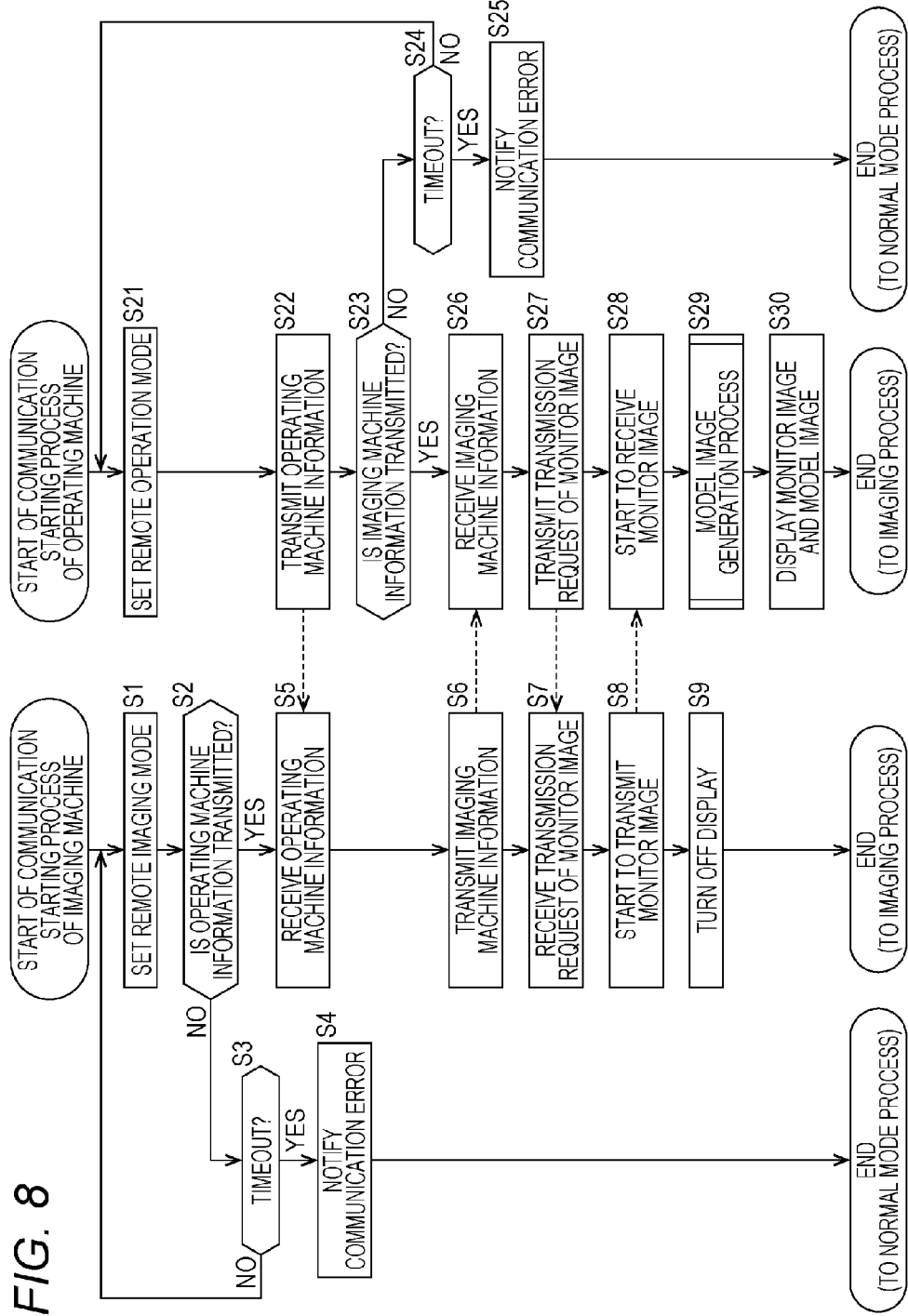
FIG. 8 is a flowchart for describing a communication start process.

Here, description is made of the model image generation process of the operating machine 2 executed in Step S29 in FIG. 8.

First, a first model image generation process is described with reference to the flowchart of FIG. 31.

Figure 31:
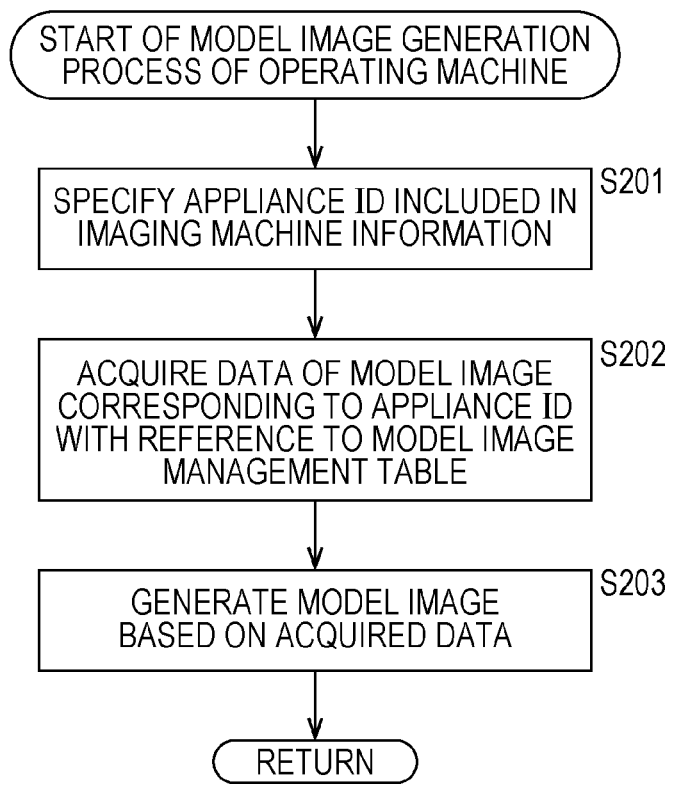
FIG. 31 is a flowchart for describing a first model image generation process performed in Step S29 in FIG. 8.

The process of FIG. 31 is the process of generating the model image using the database in which the appliance ID and the data of the model image are associated with each other.

In Step S201, the model image generation unit 103 of the operating machine 2 specifies the appliance ID included in the imaging machine information transmitted from the imaging machine 1.

In Step S202, the model image generation unit 103 acquires the data of the model image corresponding to the appliance ID of the imaging machine 1 with reference to the model image management table, which is the database in which the appliance IDs and the data of the model images are associated with each other. The model image management table is stored in, for example, the storage unit 94.

In Step S203, the model image generation unit 103 generates the model image based on the data acquired from the model image management table. After that, back to Step S29 of FIG. 8, the model image generated by the model image generation unit 103 is displayed on the remote operation screen.

Next, a second model image generation process is described with reference to the flowchart of FIG. 32.

Figure 32:
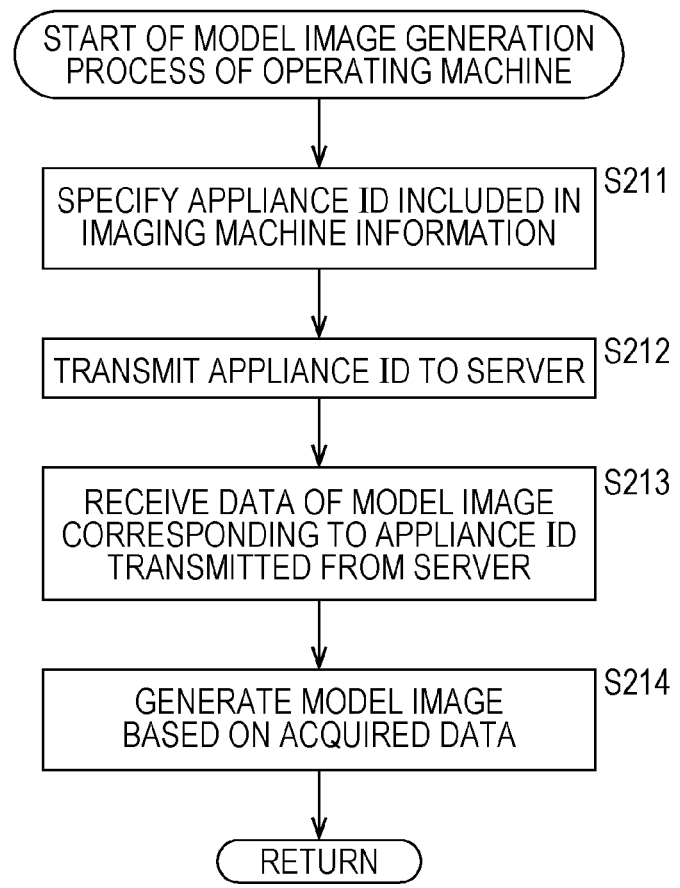
FIG. 32 is a flowchart for describing a second model image generation process performed in Step S29 in FIG. 8.

The process of FIG. 32 is the process of generating the model image based on the data acquired from a server on the Internet, which is not shown. In this case, the operating machine 2 is connected to the Internet so that the communication with the server is possible. The server includes the data base in which the appliance ID of the imaging machine and the data of the model image are associated with each other.

In Step S211, the model image generation unit 103 of the operating machine 2 specifies the appliance ID included in the imaging machine information transmitted from the imaging machine 1.

In Step S212, the model image generation unit 103 transmits the appliance ID of the imaging machine 1 to the server and requests the transmission of the data of the corresponding model image.

In Step S213, the model image generation unit 103 receives the data of the model image corresponding to the appliance ID of the imaging machine 1 that is transmitted from the server.

In Step S214, the model image generation unit 103 generates the model image based on the data acquired from the server. After that, back to Step S29 of FIG. 8, the subsequent process is performed.

Next, a third model image generation process is described with reference to the flowchart of FIG. 33.

Figure 33:
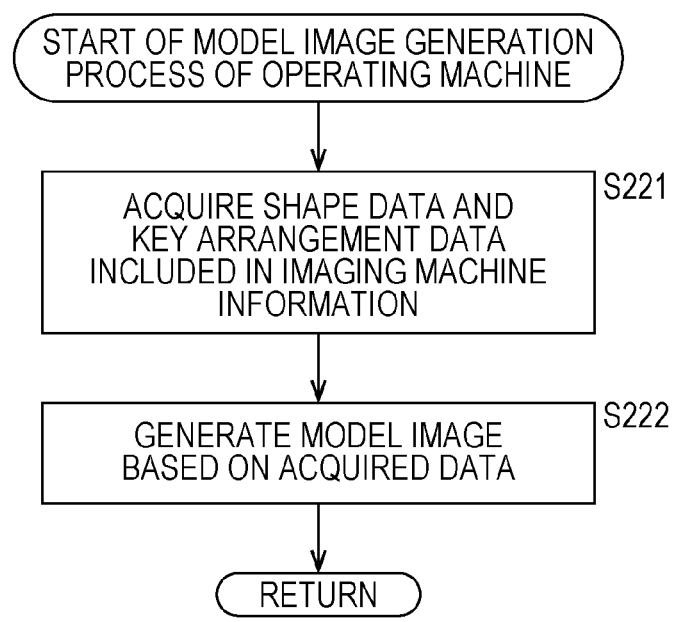
FIG. 33 is a flowchart for describing a third model image generation process performed in Step S29 in FIG. 8.

The process of FIG. 33 is the process of generating the model image using the imaging machine information transmitted from the imaging machine 1, the information including the shape data and the key arrangement data. The shape data are the data representing the shape of the external appearance of the imaging machine 1, and the key arrangement data are the data representing the arrangement of the operation keys provided for the imaging machine 1.

In Step S221, the model image generation unit 103 of the operating machine 2 acquires the shape data and the key arrangement data included in the imaging machine information transmitted from the imaging machine 1.

In Step S222, the model image generation unit 103 generates the model image based on the acquired shape data and key arrangement data. The model image generation unit 103 draws the external appearance of the imaging machine 1 based on the shape data, and arranges the operation key images at positions expressed by the key arrangement data, thereby generating the model image. After that, the process returns to Step S29 of FIG. 8 and the process continues.

In this manner, the model image can be generated by various methods. For example, the imaging machine 1 may manage the data of the model image representing the external appearance and the data may be included in the imaging machine information and provided to the operating machine 2 and used to display the model image.

[Effect]

By displaying the model image that can be freely rotated, magnified, or reduced by the contact operation on the touch panel 92 as above, the remote operation using the entire operation keys of the imaging machine 1 becomes possible.

Moreover, by displaying the entire operation keys on the model image, the complicated control for assigning the operation using the unshown operation key to another operation key or incorporating the item for enabling the operation into the menu becomes unnecessary. If the items of the various operations are incorporated in the menu displayed overlapped on the image of the subject to be captured, the subject may be hidden under the display of the item and become invisible; however, such a problem can be prevented. The user can instruct the operation as if the user used the machine normally, whereby the risk of wrong operation can be reduced.

The information including the image during capturing, the remaining battery, the number of photos that can be taken, and the imaging mode, which is displayed in the imaging machine 1 in the normal use, is transmitted directly to the operating machine 2 and displayed on the monitor image; therefore, the user can know all the pieces of information of the imaging machine 1 necessary for the image capture on the operating machine 2. This enables the user to avoid the inconvenience, for example, miss the opportunity of taking a good picture due to the lack of capacity in memory card or make the subject wait for a long time to exchange the memory card.

Moreover, if the image of the operation key that, after the operation, does not restore automatically to the state before the operation is operated on the model mage, the user is notified of the return to the state before the remote operation at the end of the communication; thus, it is possible to prevent the user from misunderstanding the setting.

In the remote imaging mode, the display 11 of the imaging machine 1 is turned off unless the motion is detected; thus, the power consumption of the imaging machine 1 can be suppressed.

<Modified Example>

In the above example, the control command list is included in the imaging machine information and provided from the imaging machine 1 to the operating machine 2; alternatively, the operating machine 2 may inquire the server based on the appliance ID included in the imaging machine information and the control command list may be acquired from the server.

Moreover, the imaging machine 1 has been described as the digital still camera; however, various appliances with the imaging function, such as a portable phone or a game machine, can be operated remotely.

[Structure Example of Computer]

A series of processes described above can be executed using either hardware or software. In the case of executing the processes using the software, the programs constituting the software are installed from a program recording medium to a computer incorporated in the dedicated hardware or a versatile personal computer.

FIG. 34 is a block diagram illustrating a configuration example of the hardware of the computer that executes the processes with the programs.

A CPU (Central Processing Unit) 401, a ROM (Read Only Memory) 402, and a RAM (Random Access Memory) 403 are connected to each other through a bus 404.

The bus 404 has an input/output interface 405 connected thereto. The input/output interface 405 has an input unit 406 such as a key board or a mouse, and an output unit 407 such as a display or a speaker connected thereto. Moreover, the input/output interface 405 has a storage unit 408 such as a hard disk or a nonvolatile memory, a communication unit 409 such as a network interface, and a drive 410 that drives a removable medium 411 connected thereto.

The computer with the above configuration performs the processes by having the CPU 401 load the programs stored in the storage unit 408 to the RAM 403 through the input/output interface 405 and the bus 404 and execute the programs.

The programs executed by the CPU 401 are provided by being recorded in the removable medium 411, or provided through a wired or wireless transmission medium such as the local area network, the Internet, or the digital satellite broadcast and installed in the storage unit 408.

The programs executed by the computer may be the programs that perform the processes in time-series manner according to the order described in the present specification, or the programs that perform the processes at the same time or at a necessary timing such as when calling is made.

The embodiments of the present technique are not limited to the above embodiments and various modifications can be made without departing from the scope of the present technique.

For example, the present technique can have the structure of cloud computing in which a plurality of devices works together by sharing one function through a network.

Each step described in the flowchart can be executed in one device or shared among a plurality of devices.

Further, if one step includes a plurality of processes, the plural processes included in one step can be executed in one device or shared among a plurality of devices.

In this specification, the system refers to a group of a plurality of components (such as devices or modules (parts)), and whether all the components are present in one case or not does not matter. Therefore, a plurality of devices housed in separate cases and connected to each other through a network, and one device containing a plurality of modules in one case are both referred to as a system.

[Example of Combination of Structures]

The present technique can have any of structures as below.

(1)

An information processing terminal including:

a communication unit that wirelessly communicates with an imaging machine to receive imaging machine information including identification information of the imaging machine and an image during capturing by the imaging machine;

a generation unit that generates an image of an external appearance of the imaging machine based on the imaging machine information;

a display control unit that displays the image during capturing and the image of the external appearance on one screen in a display unit; and a detection unit that detects contact operation on the display unit, wherein the display control unit changes a direction and a size of the image of the external appearance in response to the contact operation.

(2)

The information processing terminal according to (1), wherein the detection unit detects the contact operation for an operation key image, which is an image of an operation key provided for the imaging machine and which is included in the image of the external appearance, and the communication unit transmits to the imaging machine, a control command in accordance with the operation key image for which the contact operation has been performed.

(3)

The information processing terminal according to (2), wherein the display control unit changes a state of the operation key image in response to detection of the contact operation for the operation key image.

(4)

The information processing terminal according to (2) or (3), further including:

a management unit that manages information representing whether the operation key is a key that, after operation, returns to a state before the operation; and a history management unit that manages a history of operation using the operation key image, wherein the display control unit displays information notifying that, if the history indicates the operation has been conducted using the operation key image representing the operation key that does not return to the state before the operation, the state of the operation key in the imaging machine is different from the state after the operation at an end of the communication with the imaging machine.

(5)

The information processing terminal according to (4), wherein the imaging machine information includes the control command and the information representing whether the key is the key that returns to the state before the operation.

(6)

The information processing terminal according to any of (1) to (5), wherein the generation unit acquires data of the image of the external appearance from a server connected through a network based on the identification information and generates the image of the external appearance.

(7)

The information processing terminal according to any of (1) to (6), wherein the imaging machine information includes information representing the shape of the imaging machine and information representing the arrangement of the operation keys on the imaging machine, and the generation unit generates the image of the external appearance based on the information included in the imaging machine information.

(8)

The information processing terminal according to any of (1) to (7), wherein the communication unit receives as the image during capturing, an image obtained by overlapping information representing a state of the imaging machine on the image captured by the imaging machine.

(9)

The information processing terminal according to any of (1) to (8), wherein the display control unit displays the image during capturing and the image of the external appearance in regions formed not to overlap with each other on the screen and changes the size of the display region of the image during capturing and the display region of the image of the external appearance in response to the contact operation.

(10)

The information processing terminal according to any of (1) to (9), wherein the communication unit receives information representing that motion has been detected, which is transmitted from the imaging machine, and the display control unit displays the information representing that the motion has been detected in the imaging machine in response to reception of the information representing that the motion has been detected.

(11)

An information processing method including:

communicating wirelessly with an imaging machine to receive imaging machine information including identification information of the imaging machine and an image during capturing by the imaging machine;

generating an image of an external appearance of the imaging machine based on the imaging machine information;

displaying the image during capturing and the image of the external appearance on one screen of a display unit;

detecting contact operation on the display unit; and changing a direction and a size of the image of the external appearance in response to the contact operation.

(12)

A program causing a computer to execute a process including:

communicating wirelessly with an imaging machine to receive imaging machine information including identification information of the imaging machine and an image during capturing by the imaging machine;

generating an image of an external appearance of the imaging machine based on the imaging machine information;

displaying the image during capturing and the image of the external appearance on one screen of a display unit;

detecting contact operation on the display unit; and changing a direction and a size of the image of the external appearance in response to the contact operation.

(13)

An imaging machine including:

an imaging unit;

a communication unit that wirelessly communicates with an information processing terminal which displays on one screen of a display unit, an image during capturing and an image of an external appearance of the imaging machine generated based on imaging machine information including identification information of the imaging machine, and which changes a direction and a size of the image of the external appearance in response to contact operation on the display unit to transmit the imaging machine information and the image during capturing by the imaging unit and receive a control command in accordance with an operation key image for which the contact operation has been conducted, the operation key image corresponding to an image of the operation key on the imaging machine included in the image of the external appearance and the control command being transmitted from the information processing terminal in response to the detection of the contact operation for the operation key image; and an execution unit that performs a process in accordance with the control command.

(14)

The imaging machine according to (13), further including:

a display unit that displays the image during capturing;

a management unit that manages an operation mode; and a display control unit that controls not to display the image during capturing while the operation mode for performing the process in accordance with the control command is set.

(15)

The imaging machine according to (13) or (14), wherein the imaging machine information includes the control command, information representing whether the operation key is a key that, after operation, returns to a state before the operation, information representing the shape of the imaging machine, and information representing the arrangement of the operation keys.

(16)

The imaging machine according to any of (13) to (15), further including a motion detection unit that detects motion of the imaging machine, wherein upon the detection of the motion, the communication unit transmits information representing that the motion has been detected to the information processing terminal.

(17)

An information processing method including:

capturing an image;

wirelessly communicating with an information processing terminal that displays an image during capturing and an image of an external appearance of an imaging machine generated based on imaging machine information including identification information of the imaging machine on one screen of a display unit and that changes a direction and a size of the image of the external appearance in response to contact operation on the display unit to transmit the imaging machine information and the image during capturing by the imaging unit;

receiving a control command in accordance with an operation key image for which the contact operation has been conducted, the operation key image corresponding to an image of the operation key on the imaging machine included in the image of the external appearance and the control command being transmitted from the information processing terminal in response to the detection of the contact operation for the operation key image; and performing a process in accordance with the control command.

(18)
A program causing a computer to execute a process including:
   capturing an image;
   wirelessly communicating with an information processing terminal that displays an image during capturing and an image of an external appearance of an imaging machine generated based on imaging machine information including identification information of the imaging machine on one screen of a display unit and that changes a direction and a size of the image of the external appearance in response to contact operation on the display unit to transmit the imaging machine information and the image during capturing by the imaging unit;
   receiving a control command in accordance with an operation key image for which the contact operation has been conducted, the operation key image corresponding to an image of the operation key on the imaging machine included in the image of the external appearance and the control command being transmitted from the information processing terminal in response to the detection of the contact operation for the operation key image; and
   performing a process in accordance with the control command.

(19) A remote imaging system including an information processing terminal and an imaging machine,
   the information processing terminal including:
   a communication unit that wirelessly communicates with an imaging machine to receive imaging machine information including identification information of the imaging machine and an image during capturing by the imaging machine;
   a generation unit that generates an image of an external appearance of the imaging machine based on the imaging machine information;
   a display control unit that displays the image during capturing and the image of the external appearance on one screen in a display unit; and
   a detection unit that detects contact operation on the display unit, wherein
   the display control unit changes a direction and a size of the image of the external appearance in response to the contact operation,
   the detection unit detects the contact operation on an operation key image corresponding to an image of an operation key on the imaging machine included in the image of the external appearance, and
   the communication unit transmits to the imaging machine, a control command in accordance with the operation key image for which the contact operation has been performed,
   the imaging machine including:
   an imaging unit;
   a communication unit that wirelessly communicates with the information processing terminal to transmit the imaging machine information and the image during capturing by the imaging unit and receive the control command transmitted from the information processing terminal; and
   an execution unit that performs a process in accordance with the control command.

REFERENCE SIGNS LIST

1 Imaging machine
2 Operating machine
11 Display
35 Control unit
51 Mode setting unit
52 Command execution unit
53 Display control unit
81 Display
91 Control unit
101 Mode setting unit
102 Operation detection unit
103 Model image generation unit
104 Display control unit
105 Command list management unit
106 History management unit

The invention claimed is:
1. An information processing terminal, comprising:
   circuitry configured to:
   communicate wirelessly with an imaging machine to receive imaging machine information including identification information of the imaging machine and an image to be captured by the imaging machine;
   generate an image of an external appearance of the imaging machine based on the imaging machine information;
   display the image to be captured and the image of the external appearance on a screen of a display unit;
   detect a contact operation on the display unit for an operation key image, which is an image of an operation key of the imaging machine and is included in the image of the external appearance,
   wherein the imaging machine information further includes information representing whether the operation key is a key that, after an operation, returns to a state before the operation; and
   change a direction and a size of the image of the external appearance based on the contact operation.

2. The information processing terminal according to claim 1, wherein the circuitry is further configured to:
   transmit to the imaging machine, a control command based on the operation key image for which the contact operation has been executed.

3. The information processing terminal according to claim 2, wherein the circuitry is further configured to change a state of the operation key image based on the detection of the contact operation for the operation key image.

4. The information processing terminal according to claim 2, wherein the circuitry is further configured to:
   manage a history of the operation based on the operation key image, and
   display information that notifies, based on the history that indicates the operation has been conducted by use of the operation key image representing the operation key that remains at current state after the operation instead of returning to previous state, the state of the operation key in the imaging machine is different from the state after the operation at an end of communication with the imaging machine.

5. The information processing terminal according to claim 4, wherein the imaging machine information further includes the control command and the information representing whether the key is the key that returns to the state before the operation.

6. The information processing terminal according to claim 1, wherein the circuitry is further configured to acquire data of the image of the external appearance from a server connected through a network based on the identification information and generate the image of the external appearance.

7. The information processing terminal according to claim 1, wherein
the imaging machine information further includes information representing a shape of the imaging machine and information representing arrangement of a plurality of operation keys on the imaging machine, and
the circuitry is further configured to generate the image of the external appearance based on the information included in the imaging machine information.

8. The information processing terminal according to claim 1, wherein the circuitry is further configured to receive the image to be captured, an image obtained based on overlap between by information representing a state of the imaging machine and the image to be captured by the imaging machine.

9. The information processing terminal according to claim 1, wherein the circuitry is further configured to display the image to be captured and the image of the external appearance in different regions of the screen and change the size of a display region of the image to be captured and a display region of the image of the external appearance based on the contact operation.

10. The information processing terminal according to claim 1, wherein the circuitry is further configured to:
receive information representing that motion has been detected, which is transmitted from the imaging machine, and
display the information representing that the motion has been detected in the imaging machine based on the reception of the information representing that the motion has been detected.

11. An information processing method, comprising:
communicating wirelessly with an imaging machine to receive imaging machine information including identification information of the imaging machine and an image to be captured by the imaging machine;
generating an image of an external appearance of the imaging machine based on the imaging machine information;
displaying the image to be captured and the image of the external appearance on a screen of a display unit;
detecting a contact operation on the display unit for an operation key image, which is an image of an operation key of the imaging machine and which is included in the image of the external appearance,
wherein the imaging machine information further includes information representing whether the operation key is a key that, after an operation, returns to a state before the operation; and
changing a direction and a size of the image of the external appearance based on the contact operation.

12. A non-transitory computer-readable medium including computer-executable instructions, which when executed by a computer cause the computer to, execute operations, the operations comprising:
communicating wirelessly with an imaging machine to receive imaging machine information including identification information of the imaging machine and an image to be captured by the imaging machine;
generating an image of an external appearance of the imaging machine based on the imaging machine information;
displaying the image to be captured and the image of the external appearance on a screen of a display unit;
detecting a contact operation on the display unit for an operation key image, which is an image of an operation key of the imaging machine and which is included in the image of the external appearance,
wherein the imaging machine information further includes information representing whether the operation key is a key that, after an operation, returns to a state before the operation; and
changing a direction and a size of the image of the external appearance based on the contact operation.

13. An imaging machine, comprising:
circuitry configured to:
communicate wirelessly with an information processing terminal which displays on a screen of a display unit, an image to be captured and an image of an external appearance of the imaging machine generated based on imaging machine information including identification information of the imaging machine, and which changes a direction and a size of the image of the external appearance based on a contact operation on the display unit to transmit the imaging machine information and the image to be captured by the imaging machine;
receive a control command based on an operation key image for which the contact operation has been conducted, the operation key image corresponding to an image of the operation key on the imaging machine included in the image of the external appearance and wherein the control command is transmitted from the information processing terminal based on detection of the contact operation for the operation key image; and
execute a process based on the control command,
wherein the imaging machine information further includes information representing whether the operation key is a key that, after an operation, returns to a state before the operation.

14. The imaging machine according to claim 13, wherein the circuitry is further configured to:
display the image to be captured;
manage an operation mode; and
control the display of the image to be captured while the operation mode for executing the process based on the control command is set.

15. The imaging machine according to claim 13, wherein the imaging machine information further includes at least one of the control command, information representing a shape of the imaging machine, or information representing arrangement of a plurality of operation keys.

16. The imaging machine according to claim 13, wherein circuitry is further configured to:
detect motion of the imaging machine; and transmit information representing that the motion has been detected to the information processing terminal.

17. An information processing method, comprising:
capturing an image;
wirelessly communicating with an information processing terminal that displays an image to be captured and an image of an external appearance of an imaging machine generated based on imaging machine information including identification information of the imaging machine on a screen of a display unit and that changes a direction and a size of the image of the external appearance based on a contact operation on the display unit to transmit the imaging machine information and the image to be captured by the imaging machine;
receiving a control command based on an operation key image for which the contact operation has been conducted, the operation key image corresponding to an image of the operation key on the imaging machine included in the image of the external appearance and wherein the control command is transmitted from the information processing terminal based on detection of the contact operation for the operation key image; and executing a process based on the control command, wherein the imaging machine information further includes information representing whether the operation key is a key that, after an operation, returns to a state before the operation.

18. A non-transitory computer-readable medium including computer-executable instructions, which when executed by a computer cause the computer to, execute operations, the operations comprising:

capturing an image;

wirelessly communicating with an information processing terminal that displays an image to be captured and an image of an external appearance of an imaging machine generated based on imaging machine information including identification information of the imaging machine on a screen of a display unit and that changes a direction and a size of the image of the external appearance based on a contact operation on the display unit to transmit the imaging machine information and the image to be captured by the imaging machine;

receiving a control command based on an operation key image for which the contact operation has been conducted, the operation key image corresponding to an image of the operation key on the imaging machine included in the image of the external appearance and wherein the control command is transmitted from the information processing terminal based on detection of the contact operation for the operation key image; and executing a process based on the control command, wherein the imaging machine information further includes information representing whether the operation key is a key that, after an operation, returns to a state before the operation.

19. A remote imaging system, comprising:

an information processing terminal and an imaging machine, the information processing terminal including a first circuitry configured to:

communicate wirelessly with the imaging machine to receive imaging machine information including identification information of the imaging machine and an image to be captured by the imaging machine;

generate an image of an external appearance of the imaging machine based on the imaging machine information;

display the image to be captured and the image of the external appearance on a screen of a display unit;

detect a contact operation on the display unit for an operation key image corresponding to an image of an operation key on the imaging machine included in the image of the external appearance, wherein the imaging machine information further includes information representing whether the operation key is a key that, after an operation, returns to a state before the operation;

change a direction and a size of the image of the external appearance based on the contact operation; and transmit to the imaging machine, a control command based on the operation key image for which the contact operation has been executed; and the imaging machine including a second circuitry configured to:

communicate wirelessly with the information processing terminal to transmit the imaging machine information and the image to be captured by the imaging machine and receive the control command transmitted from the information processing terminal; and execute a process based on the control command.

* * * * *